US012688106B2

(12) United States Patent
Samudrala et al.

(10) Patent No.: US 12,688,106 B2
(45) Date of Patent: Jul. 21, 2026

(54) METHODS AND SYSTEMS FOR GENERATION AND OPTIMIZATION OF METRIC THRESHOLD FOR ANOMALY DETECTION

(71) Applicant: Tata Consultancy Services Limited, Mumbai (IN)

(72) Inventors: Satya Narayana Samudrala, Pune (IN); Kunal Jethuri, New Delhi (IN); Priyadarshi Rai, Pune (IN); Maitreya Natu, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 105 days.

(21) Appl. No.: 18/539,575

(22) Filed: Dec. 14, 2023

(65) Prior Publication Data

US 2024/0202093 A1 Jun. 20, 2024

(30) Foreign Application Priority Data

Dec. 16, 2022 (IN) .............................. 202221073064

(51) Int. Cl.
*G06F 11/00* (2006.01)
*G06F 11/07* (2006.01)
*G06F 11/34* (2006.01)

(52) U.S. Cl.
CPC ...... *G06F 11/3409* (2013.01); *G06F 11/0754* (2013.01); *G06F 11/3452* (2013.01); *G06F 2201/81* (2013.01)

(58) Field of Classification Search
CPC ............. G06F 11/3409; G06F 11/3452; G06F 11/0754; G06N 20/00
See application file for complete search history.

(56) References Cited

U.S. PATENT DOCUMENTS 7,444,263 B2 10/2008 White et al.
8,457,928 B2 6/2013 Dang et al.
(Continued)

OTHER PUBLICATIONS

Kholodovsky et al., "A generalized Spatio-Temporal Threshold Clustering method for identification of extreme event patterns," Adv. Stat. Clim. Meterol. Oceanogr., 7:35-52 (2021).

*Primary Examiner* — Elmira Mehrmanesh
(74) *Attorney, Agent, or Firm* — Finnegan, Henderson, Farabow, Garrett & Dunner, LLP

(57) ABSTRACT

The present disclosure is related to the field of threshold generation where complex temporal and spatial behavior of metrics are modelled to define normal operating baseline of every component in a system environment. Embodiments of the present disclosure provide methods and systems for generation and optimization of metric threshold for anomaly detection. In the present disclosure, temporal properties such as variation, behavioral patterns of a plurality of metrics are derived. The derived temporal properties are used to generate data-driven and domain-aware static or dynamic thresholds. Additionally, the present disclosure factors spatial and temporal properties collectively to mine a role of influencing metrics and define composite thresholds. In order to cater to dynamic behavior of the system environment and changes in business and technological aspects, the system and method of the present disclosure self-learns, self-tunes, and adapts itself based on user feedback which helps in capturing tacit knowledge of domain experts.

13 Claims, 18 Drawing Sheets

(56) References Cited

U.S. PATENT DOCUMENTS

| 2003/0079160 | A1* | 4/2003 | McGee | .................. | G06F 17/18 |
| | | | | | 714/39 |
| 2003/0110007 | A1* | 6/2003 | McGee | .................. | G06F 17/15 |
| | | | | | 702/179 |
| 2013/0346594 | A1 | 12/2013 | Banerjee et al. | | |
| 2016/0103559 | A1* | 4/2016 | Maheshwari | ......... | G06F 3/0481 |
| | | | | | 715/738 |
| 2022/0329613 | A1* | 10/2022 | Abbaszadeh | ....... | H04L 63/1416 |
| 2023/0229550 | A1* | 7/2023 | Zhao | .................. | H04L 41/0627 |
| | | | | | 714/33 |

* cited by examiner

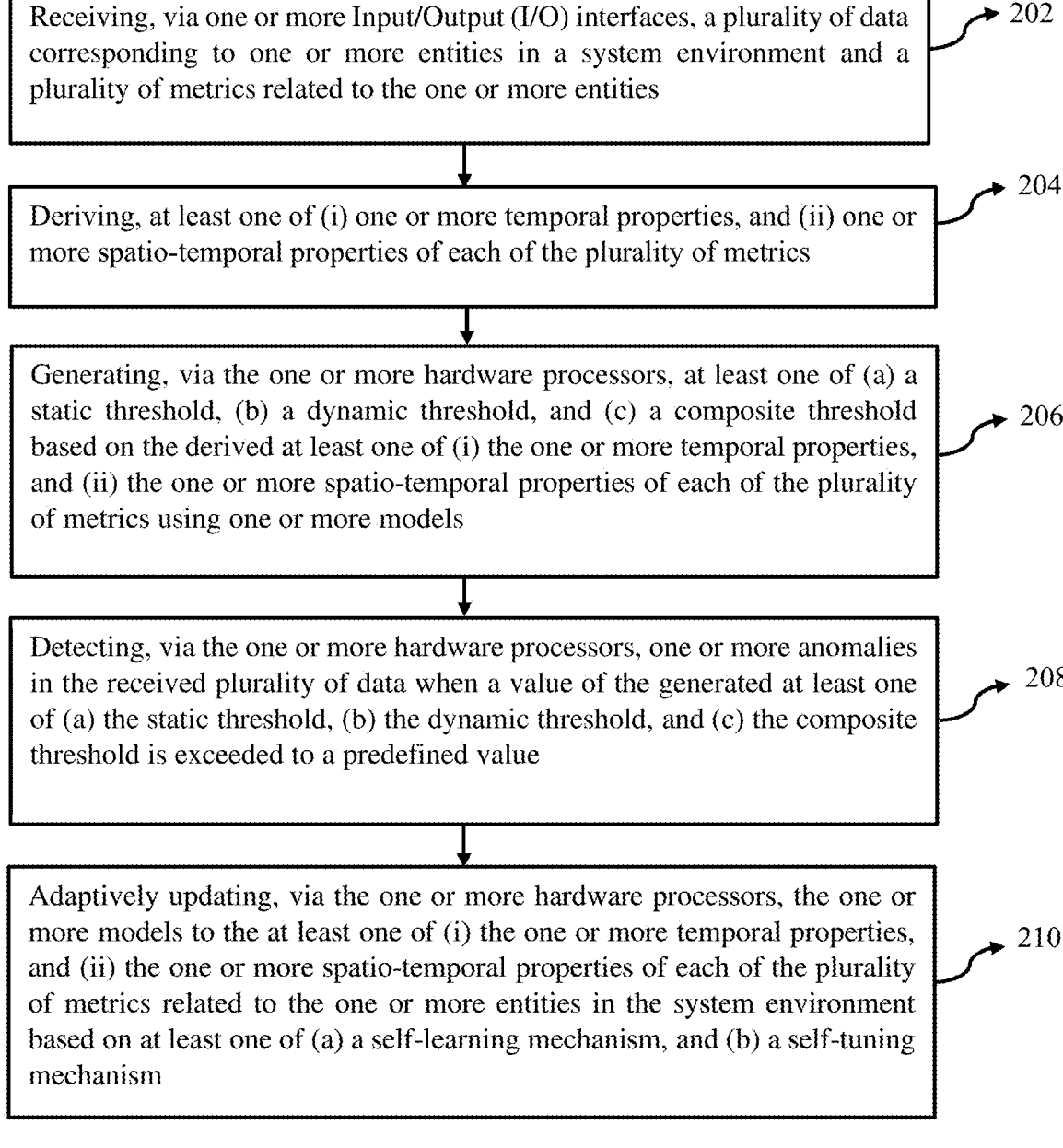

Receiving, via one or more Input/Output (I/O) interfaces, a plurality of data corresponding to one or more entities in a system environment and a plurality of metrics related to the one or more entities    202

Deriving, at least one of (i) one or more temporal properties, and (ii) one or more spatio-temporal properties of each of the plurality of metrics    204

Generating, via the one or more hardware processors, at least one of (a) a static threshold, (b) a dynamic threshold, and (c) a composite threshold based on the derived at least one of (i) the one or more temporal properties, and (ii) the one or more spatio-temporal properties of each of the plurality of metrics using one or more models    206

Detecting, via the one or more hardware processors, one or more anomalies in the received plurality of data when a value of the generated at least one of (a) the static threshold, (b) the dynamic threshold, and (c) the composite threshold is exceeded to a predefined value    208

Adaptively updating, via the one or more hardware processors, the one or more models to the at least one of (i) the one or more temporal properties, and (ii) the one or more spatio-temporal properties of each of the plurality of metrics related to the one or more entities in the system environment based on at least one of (a) a self-learning mechanism, and (b) a self-tuning mechanism    210

METHODS AND SYSTEMS FOR GENERATION AND OPTIMIZATION OF METRIC THRESHOLD FOR ANOMALY DETECTION

PRIORITY CLAIM

This U.S. patent application claims priority under 35 U.S.C. § 119 to: India Application No. 202221073064, filed on Dec. 16, 2022. The entire contents of the aforementioned application are incorporated herein by reference.

TECHNICAL FIELD

The embodiments herein generally relate to threshold generation for anomaly detection, and, more particularly, to methods and systems for generation and optimization of metric threshold for anomaly detection.

BACKGROUND

Organizations across the globe require a reliable anomaly detection solution that allows for continuous quality control. Considering the scale and complexity of infrastructure, most common methods include setting a blanket threshold by using knowledge of the experts or by applying simple statistical measures, which results in an alarm deluge. There exist several supervised methods and unsupervised methods for anomaly detection. However, a fundamental challenge in developing an anomaly detection system that can identify and diagnose abnormalities is lack of anomaly labels in historical data, making existing supervised algorithms infeasible.

Further, existing unsupervised methods for grouping similar data points, such as K-means clustering, and density estimation methods may not always perform well since they cannot capture temporal behavior across different time stamps. Few existing temporal prediction models such as autoregressive integrated moving average (ARIMA) and long-short term memory (LSTM) have been used to capture temporal behavior across different time steps. But, they are susceptible to data noise, and excessive noise may lead to an increase in false positives. Anomaly detection can be applied to multiple time series either independently or concurrently. Independently applying anomaly detection to multiple time series either ignores correlation across time series or performs some dimensionality reduction technique to generate a new set of uncorrelated or univariate time series.

SUMMARY

Embodiments of the present disclosure present technological improvements as solutions to one or more of the above-mentioned technical problems recognized by the inventors in conventional systems.

For example, in an aspect, a processor implemented method is used. The processor implemented method, comprising receiving, via one or more Input/Output (I/O) interfaces, a plurality of data corresponding to one or more entities in a system environment and a plurality of metrics related to the one or more entities; deriving, via the one or more hardware processors, at least one of (i) one or more temporal properties, and (ii) one or more spatio-temporal properties of each of the plurality of metrics; generating, via the one or more hardware processors, at least one of (a) a static threshold, (b) a dynamic threshold, and (c) a composite threshold based on the derived at least one of (i) the one or more temporal properties, and (ii) the one or more spatio-temporal properties of each of the plurality of metrics using one or more models; detecting, via the one or more hardware processors, one or more anomalies in the received plurality of data when a value of the generated at least one of (a) the static threshold, (b) the dynamic threshold, and (c) the composite threshold is exceeded to a predefined value; and adaptively updating, via the one or more hardware processors, the one or more models to the at least one of (i) the one or more temporal properties, and (ii) the one or more spatio-temporal properties of each of the plurality of metrics related to the one or more entities in the system environment based on at least one of (a) a self-learning mechanism, and (b) a self-tuning mechanism.

In another aspect, a system for is provided. The system comprises a memory storing instructions; one or more Input/Output (I/O) interfaces; and one or more hardware processors coupled to the memory via the one or more I/O interfaces, wherein the one or more hardware processors are configured by the instructions to receive a plurality of data corresponding to one or more entities in a system environment and a plurality of metrics related to the one or more entities; derive at least one of (i) one or more temporal properties, and (ii) one or more spatio-temporal properties of each of the plurality of metrics; generate at least one of (a) a static threshold, (b) a dynamic threshold, and (c) a composite threshold based on the derived at least one of (i) the one or more temporal properties, and (ii) the one or more spatio-temporal properties of each of the plurality of metrics using one or more models; detect one or more anomalies in the received plurality of data when a value of the generated at least one of (a) the static threshold, (b) the dynamic threshold, and (c) the composite threshold is exceeded to a predefined value; and adaptively update the one or more models to the at least one of (i) the one or more temporal properties, and (ii) the one or more spatio-temporal properties of each of the plurality of metrics related to the one or more entities in the system environment based on at least one of (a) a self-learning mechanism, and (b) a self-tuning mechanism.

In yet another aspect, there are provided one or more non-transitory machine-readable information storage mediums comprising one or more instructions, which when executed by one or more hardware processors causes a method for. The method includes receiving, a plurality of data corresponding to one or more entities in a system environment and a plurality of metrics related to the one or more entities; deriving, at least one of (i) one or more temporal properties, and (ii) one or more spatio-temporal properties of each of the plurality of metrics; generating, at least one of (a) a static threshold, (b) a dynamic threshold, and (c) a composite threshold based on the derived at least one of (i) the one or more temporal properties, and (ii) the one or more spatio-temporal properties of each of the plurality of metrics using one or more models; detecting, one or more anomalies in the received plurality of data when a value of the generated at least one of (a) the static threshold, (b) the dynamic threshold, and (c) the composite threshold is exceeded to a predefined value; and adaptively updating, the one or more models to the at least one of (i) the one or more temporal properties, and (ii) the one or more spatio-temporal properties of each of the plurality of metrics related to the one or more entities in the system environment based on at least one of (a) a self-learning mechanism, and (b) a self-tuning mechanism.

In accordance with an embodiment of the present disclosure, the one or more hardware processors are further configured to continuously monitor, a mismatch between the generated at least one of (a) the static threshold, (b) the dynamic threshold, and (c) the composite threshold with a pre-determined threshold; and recommend, a corrected threshold when a mismatch between the generated at least one of (a) the static threshold, (b) the dynamic threshold, and (c) the composite threshold and the pre-determined threshold is detected.

In accordance with an embodiment of the present disclosure, wherein the static threshold is generated based on a mean, a standard variation, and an aggressiveness factor of each of the plurality of metrics related to the one or more entities in the system environment.

In accordance with an embodiment of the present disclosure, step of generating the dynamic threshold comprises: resampling and categorizing the plurality of data into a plurality of buckets for a plurality of dimensions of the one or more temporal properties of each of the plurality of metrics related to the one or more entities in the system environment; computing a representative value for each bucket from the plurality of buckets, wherein the representative value is computed based on a mean, and a standard deviation for each bucket from the plurality of buckets for each dimension from the plurality of dimensions; computing an intra-bucket variation (ITA) for the plurality of data and inter-bucket variation (ITR) for the representative value for each bucket from the plurality of buckets, wherein the intra-bucket variation (ITA) captures average spread of a plurality of data points within each bucket from the plurality of buckets and the inter-bucket variation (ITR) captures variation of the plurality of data points across the plurality of dimensions; generating a score for the one or more temporal properties of each of the plurality of metrics related to the one or more entities in the system environment based on the ITR and ITA; identifying an optimal temporal property from the one or more temporal properties of each of the plurality of metrics related to the one or more entities in the system environment based on the generated score; and generating the dynamic threshold based on the mean, the standard variation and an aggressiveness factor of each of the plurality of metrics related to the one or more entities in the system environment in accordance with the identified temporal property from the one or more temporal properties.

In accordance with an embodiment of the present disclosure, step of generating the composite threshold comprises: receiving, a first set of events corresponding to an entity identified from the one or more entities in the system environment with no metric; mining, using one or more data sources, an influencing relationship between a node of the identified entity and a plurality of influencing metrics corresponding to the node of the identified entity to define a set of spatial dependencies; applying a temporal threshold analysis to each influencing metric from the plurality of influencing metrics to generate at least one of a (i) a respective static threshold, (ii) a respective dynamic threshold, and (iii) a second set of events; correlating the second set of events with the first set of events occurring in the node of the identified entity to access a plurality of temporal correlations; and generating the composite threshold based on the plurality of temporal correlations, wherein the plurality of temporal correlations are indicative of behavior of the plurality of influencing metrics.

In accordance with an embodiment of the present disclosure, the self-learning mechanism comprises: generating, a plurality of clusters of the plurality of metrics related to the one or more entities based on a plurality of metric properties; identifying a set of representative metrics for each cluster from the plurality of clusters of the plurality of metrics based on a similarity in the plurality of metric properties; generating, at least one of (i) a plurality of optimal static thresholds, (ii) a plurality of optimal dynamic thresholds, and (iii) a plurality of optimal composite thresholds across varying degree of aggressiveness for each representative metric from the set of representative metrics for each cluster from the plurality of clusters of the plurality of metrics; selecting, an optimal threshold from the at least one of (i) the plurality of optimal static thresholds, (ii) the plurality of optimal dynamic thresholds, and (iii) the plurality of optimal composite thresholds by applying one or more inputs obtained as feedback from one or more users on each of the set of representative metrics for each cluster from the plurality of clusters of the plurality of metrics; determining, a change in one or more parameters associated with the plurality of metrics related to the one or more entities in the system environment based on the one or more inputs obtained as the feedback from the one or more users on each cluster from the plurality of clusters of the plurality of metrics; and self-learning, the one or more parameters associated with the plurality of metrics in accordance with the one or more inputs obtained as the feedback from the one or more users.

In accordance with an embodiment of the present disclosure, the self-tuning mechanism comprises: obtaining, a plurality of real time delta data corresponding to the one or more entities and a set of metrics related to the one or more entities in the system environment for the plurality of real time delta data; performing temporal analysis on the set of metrics related to the one or more entities in the system environment for the plurality of real-time delta data, wherein steps for temporal analysis comprising: (a) generating, a plurality of clusters of the set of metrics related to the one or more entities in a system environment for the plurality of real time delta data based on the plurality of metric properties; (b) identifying a representative metric for each cluster from the plurality of clusters of the set of metrics based on a similarity in the plurality of metric properties; and (c) generating, at least one of (i) a plurality of optimal static thresholds, (ii) a plurality of optimal dynamic thresholds, and (iii) a plurality of optimal composite thresholds across varying degree of aggressiveness for the representative metric for each cluster from the plurality of clusters of the set of metrics; determining, a change in the one or more parameters associated with the set of metrics related to the one or more entities in the system environment for the plurality of real time delta data; and self-tuning, by auto-optimizing the one or more parameters associated with the set of metrics based on (a) the self-learning of the one or more parameters associated with the plurality of metrics and (b) the temporal analysis performed on the set of metrics related to the one or more entities in the system environment for the plurality of real-time delta data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 2, with reference to FIG. 1, illustrate an exemplary flow diagram illustrating a method for generation and optimization of metric threshold for anomaly detection, using the system 100 of FIG. 1, in accordance with some embodiments of the present disclosure.

Figure 1:
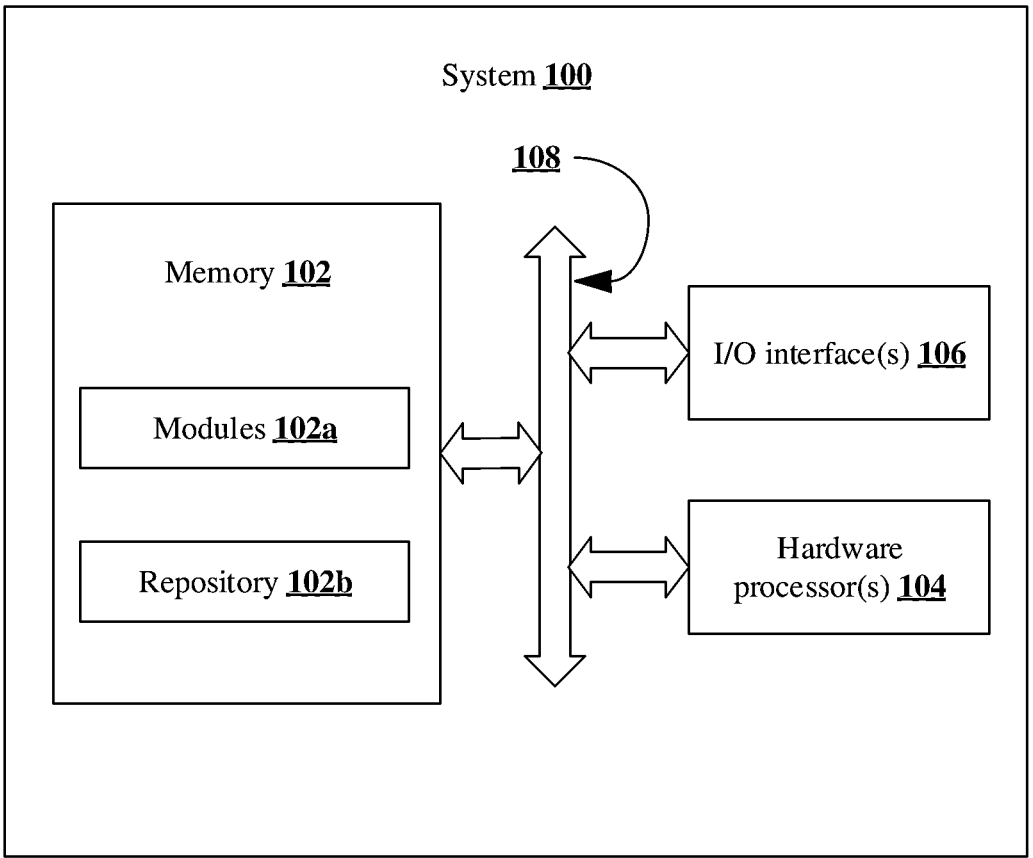
FIG. 1 is a functional block diagram of a system for generation and optimization of metric threshold for anomaly detection, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Organizations reliance on robust anomaly detection tools has been increasing due to significant transformation in space of enterprise information technology (IT). The anomaly detection tools keep a check on performance of different components of a system environment (alternatively referred as estate) in order to maintain stability and business continuity. This requires continuously monitoring metrics at regular intervals, evaluating their behavior, and comparing them against normal defined operating range. Anomalies and outages that are reported from this are automatically notified to subject matter experts (SMEs) and operation managers.

In a general scenario, anomalies and outages are classified as conditions when performance of entities or components of the system environment deviates from its normal operating region. For example, an increase in Uniform Resource Locator (URL) response time from 120 ms to 300 ms in case when baseline threshold is defined as 200 ms can be classified as anomaly. Considering scale and complexity of estates, the behavior of metrics can be classified into two different categories: (a) Purely temporal and independent of spatial relationship with the estate's dependent components. These metrics could have a generalized static behavior in which their normal operating region is simply defined as a range between minimum and maximum limits, such as memory utilization of an entity ranging between 75% and 82% across different days of the week, or they could have a dynamic behavior in which properties of metrics vary across different temporal dimensions. The metrics could also have a dynamic behavior where the properties of metrics vary across different temporal dimensions. For example, memory utilization of entity Y ranging between 78% to 94% on weekdays and between 48% to 75% on weekends. (b) Furthermore, metric behavior could be dependent on both temporal properties and spatial relationship.

For example, a high response time of entity X is a result of high reads and writes of entity X. It is observed that although the spatial aspects play a significant role in defining behavioral properties of metrics, temporal aspects play an equally important role in understanding the static and dynamic behavior of metrics. Anomaly detection tools rely heavily on monitoring functions to keep a track on the performance metrics and raise alerts in case of potential outages. In order to do so, it is utmost critical for them to accurately define the baseline thresholds. This is because, anomalies are detected by comparing the metrics against these baseline thresholds and any discrepancy in defining them leads to two-fold problems (a) generating false alerts leading to too much noise (b) capturing too few alerts leading to missing out on genuine alerts.

Existing approaches of defining baseline thresholds rely on setting blanket thresholds on each metrics that are either suggested by Subject Matter Experts (SMEs) based on their domains expertise or derived using simple statistical measures. Existing approaches fail to accurately capture historical behavior of metrics, evaluate their temporal properties, assess role of sub-system interactions, and role of domain constraints, which collectively leads to discrepancy in correctly detecting anomalies and outages. For example, setting a blanket threshold of 150 ms on URL response time without factoring its temporal behavior and understanding that it generally operates in the range of 160-190 ms during peak hours of the day and reduces to 80-100 ms during the non-peak hours of the day would lead to inaccurate anomaly detection thereby leading to the generation of too many false alerts. Therefore, it becomes extremely important to characterize metrics separately by factoring their spatial and temporal behavior and derive optimal threshold to ensure that only genuine anomalies get captured.

The present disclosure addresses unresolved problems of the conventional methods by using a method to model the complex temporal and spatial behavior of metrics to define normal operating baseline of every component. Embodiments of the present disclosure provide methods and systems for generation and optimization of metric threshold for anomaly detection. In present disclosure, a comprehensive algorithm is created to derive temporal properties such as variation, behavioral patterns, an/or the like. The derived temporal properties are used to generate data-driven and domain-aware static or dynamic thresholds. Additionally, the method of the present disclosure factors spatial and temporal properties collectively to mine a role of influencing metrics and define composite thresholds. In order to cater to dynamic behavior of system environment and changes in business and technological aspects, the system and method of the present disclosure self-learns, self-tunes, and adapts itself based on user feedback which helps in capturing tacit knowledge of domain experts.

In the context of present disclosure, the expressions 'system environment' and 'estates' may be used interchangeably throughout the description. In other words, the present disclosure operates on all-time series simultaneously, taking into account temporal behavior of each individual time series as well as the correlation between them to identify anomalous data points. More specifically, the present disclosure describes two major building blocks. The first building block analyses historical behavior, mines behavioral properties, and recommends optimal thresholds for each metric under consideration. The second building block focuses on intelligently self-tuning the analysis and learning from user-feedback to capture the tacit knowledge of the domain experts.

Referring now to the drawings, and more particularly to FIGS. 1 through 15, where similar reference characters denote corresponding features consistently throughout the figures, there are shown preferred embodiments and these embodiments are described in the context of the following exemplary system and/or method.

FIG. 1 is a functional block diagram of a system for generation and optimization of metric threshold for anomaly detection, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computer, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a. The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102*b* may include a database or a data engine. Further, the repository 102*b* amongst other things, may serve as a database or includes a plurality of databases for storing the data that is processed, received, or generated as a result of the execution of the plurality of modules 102*a*. Although the repository 102*b* is shown internal to the system 100, it will be noted that, in alternate embodiments, the repository 102*b* can also be implemented external to the system 100, where the repository 102*b* may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Light-weight Directory Access Protocol (LDAP) directory and a Relational Database Management System (RDBMS). In another embodiment, the data stored in the repository 102*b* may be distributed between the system 100 and the external database.

FIG. 2, with reference to FIG. 1, illustrate an exemplary flow diagram illustrating a method for generation and optimization of metric threshold for anomaly detection, using the system 100 of FIG. 1 in accordance with some embodiments of the present disclosure.

Referring to FIG. 2, in an embodiment, the system(s) 100 comprises one or more data storage devices or the memory 102 operatively coupled to the one or more hardware processors 104 and is configured to store instructions for execution of steps of the method by the one or more processors 104. The steps of the method 200 of the present disclosure will now be explained with reference to components of the system 100 of FIG. 1, the flow diagram as depicted in FIG. 2, and one or more examples. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

In an embodiment, at step 202 of the present disclosure of FIG. 2, one or more Input/Output (I/O) interfaces 106 are configured to receive a plurality of data corresponding to one or more entities in a system environment and a plurality of metrics related to the one or more entities. In an embodiment, the plurality of data is a set of time series data represented by $X=\{X(1), X(2), \ldots, X(n)\}$. The system environment may represent an estate or set up of a domain agnostic infrastructure of an organization. In the context of present disclosure, sequence of measurements from a time series $X(i)$ are represented by $X(i)=<x1(i), x2(i), \ldots, xm(i)>$, where, $1 \leq i \leq n$. The one or more entities of the system environment represent the components of the system environment. In the present disclosure, each of the plurality of metrics have timestamp and values and each metric is recommended to have at least a history of 3 months to get strong insights. Few examples of the plurality of metrics may include but not limited to CPU utilization, memory utilization, disk utilization, and/or the like in the one or more entities and a process having start time, end time and runtime in a batch system.

Further, at step 204 of FIG. 2, the one or more hardware processors 104 are configured to derive at least one of (i) one or more temporal properties, and (ii) one or more spatio-temporal properties of each of the plurality of metrics. At step 206 of FIG. 2, the one or more hardware processors 104 are configured to generate, at least one of (a) a static threshold, (b) a dynamic threshold, and (c) a composite threshold based on the derived at least one of (i) the one or more temporal properties, and (ii) the one or more spatio-temporal properties of each of the plurality of metrics using one or more models. The one or more models are machine learning models that are implemented by the system 100 and used to receive the plurality of data, understand domain aware patterns and generate the static thresholds, the dynamic thresholds or the composite thresholds.

The steps 204 and 206 is further illustrated and better understood by way of following exemplary explanation.

The present disclosure internally applies three different methods of deriving baseline thresholds, in order to recommend thresholds by considering both the temporal as well as spatial properties. Using pure temporal analysis, it derives static threshold and dynamic thresholds, whereas using a combination of spatial and temporal analysis, it derives composite thresholds. It then recommends the optimal threshold that best represent the behavioral properties and captures the different constraints effectively. At first, a steady state of the metric under consideration is detected using change detection. Change-point refers to a significant and persistent change in behavior of the plurality of metrics due to some internal infrastructural changes or due to some external influencers. Change-point detection is performed before analyzing the data for threshold recommendation to derive most recent steady state of the metric under consideration, an ensemble of change detection algorithm is used to detect changes in mean, variation, patterns, and trend.

Figure 3:
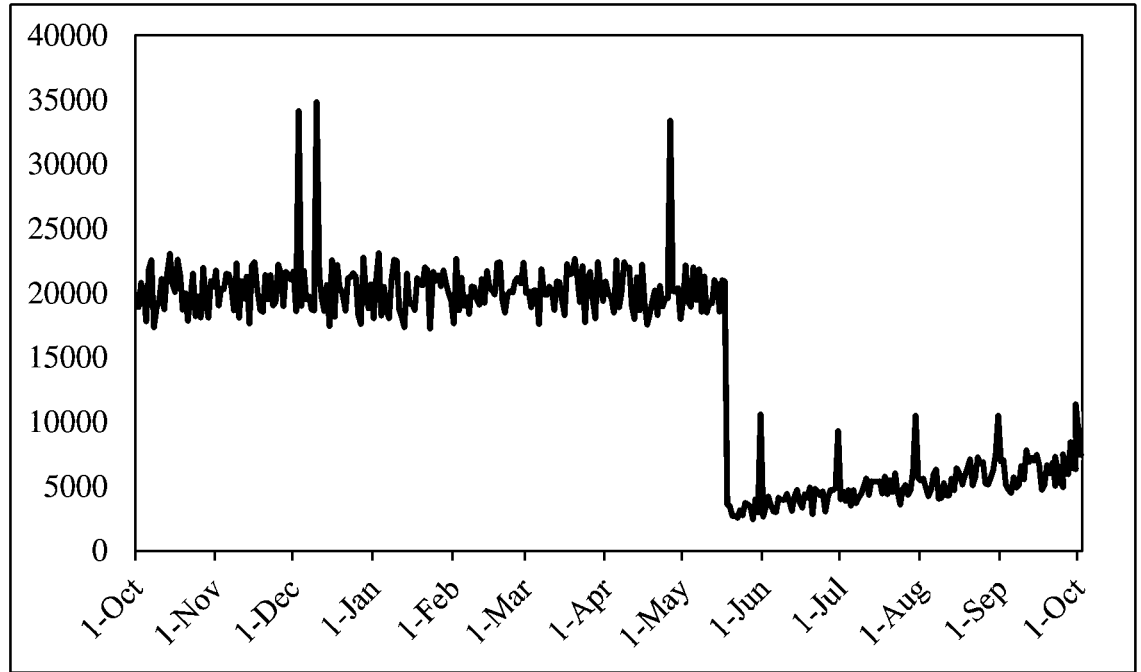
FIG. 3 shows graphical representation of a case of change detection due to change in mean and trend of the time series, in accordance with some embodiments of the present disclosure.

FIG. 3 shows graphical representation of a case of change detection due to change in mean and trend of the time series in accordance with some embodiments of the present disclosure. Static thresholds represent a first case of pure temporal threshold recommendations. These are derived and recommended in cases when the metric under consideration has a generalized behavior across different temporal dimension, observes little or no variation, and does not vary with change in temporal conditions.

Figure 4:
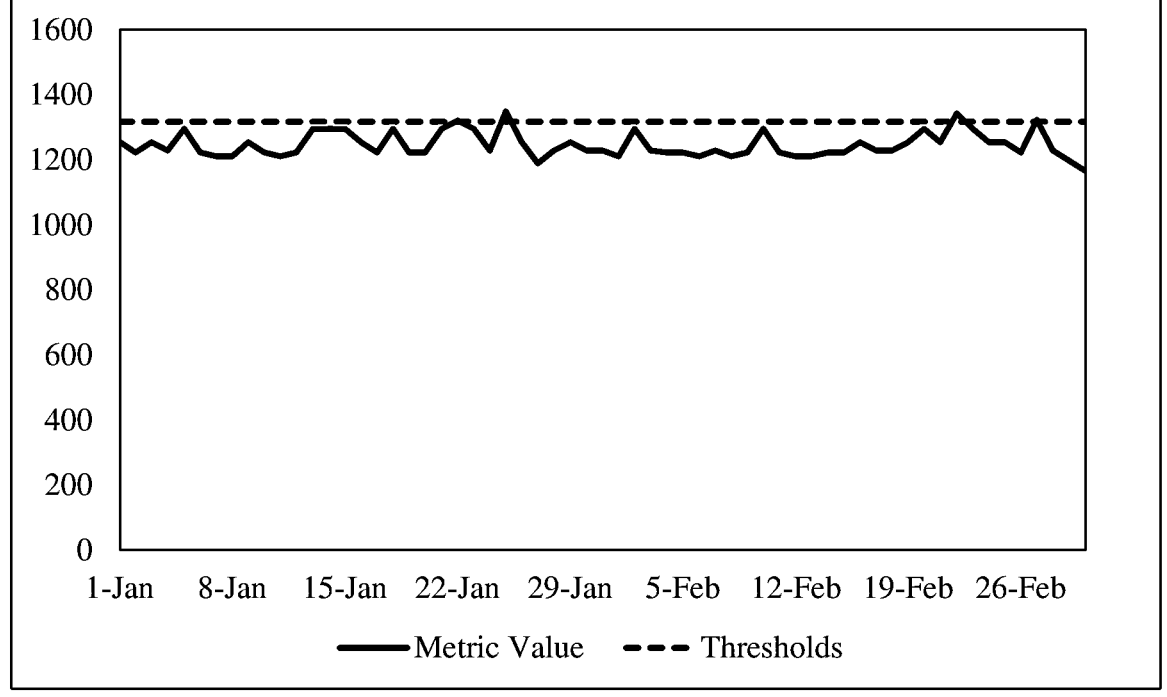
FIG. 4 shows graphical representation of an example of metrics with static thresholds, in accordance with some embodiments of the present disclosure.

FIG. 4 shows graphical representation of an example of metrics with static thresholds in accordance with some embodiments of the present disclosure. As shown in FIG. 4, execution time of a process ranges between 1200 seconds to 1300 seconds and does not follow a specific behavioral pattern because of which it cannot be classified to have a temporal pattern. Additionally, the behavior of the process does not gets influenced by change in behavior of other jobs in the estate under any condition. For such cases, a single threshold value known as static threshold is used to optimally monitor the behavior of metric and capture deviations. The static threshold is generated based on a mean, a standard variation and an aggressiveness factor of each of the plurality of metrics related to the one or more entities in the system environment. To compute static threshold of a metric, first the mean $\mu(g)$ and standard deviation $\sigma(g)$ of the metric is computed. Further, value of the aggressiveness factor $\alpha$ is derived based on how close data distribution is to the normal behavior. Kurtosis coefficient is used to derive a. Alternately, user is also allowed to override it. For cases when the metric under consideration observes variation, static threshold (ST) is defined as provide in equation (1) and equation (2) below:

$$ST(\text{upper}) = \mu(g) + \alpha\sigma(g) \tag{1}$$

$$ST(\text{lower}) = \mu(g) - \alpha\sigma(g) \tag{2}$$

Once the static threshold values are derived using the behavioral properties of metrics, a plurality of domain constraints such as upper limit of thresholds (UL) and lower limit of thresholds (LL) are factored to recommend the optimal threshold value which are computed as provided in equation (3) and equation (4) below:

$$ST(\text{upper}) = \max(ST(\text{upper}), LL) \tag{3}$$

$$ST(\text{lower}) = \min(ST(\text{lower}), UL) \tag{4}$$

Figure 5A:
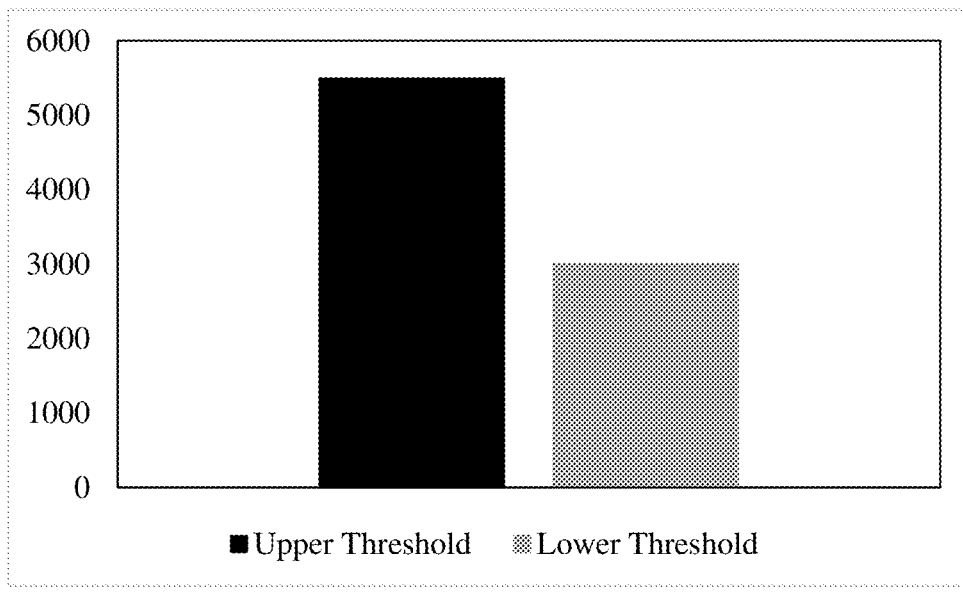
FIGS. 5A and 5B show graphical representation illustrating recommended static threshold and static threshold evidence respectively for a metric under consideration, in accordance with some embodiments of the present disclosure.
Figure 5B:
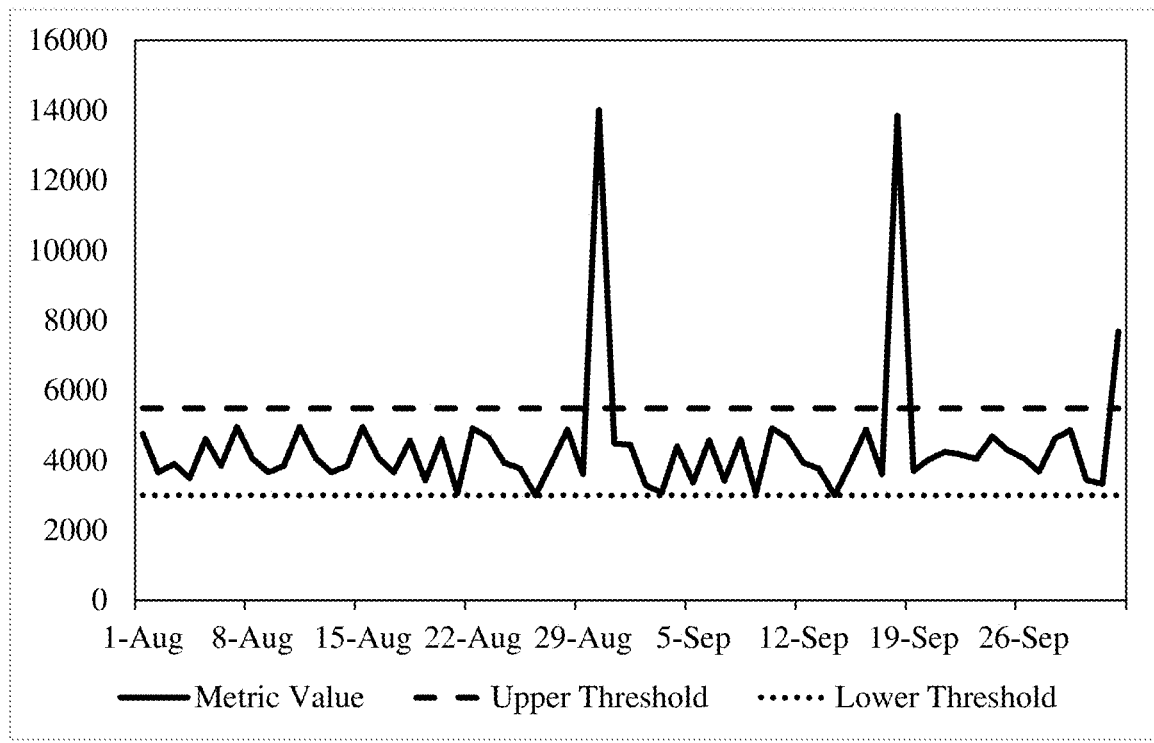

FIGS. 5A and 5B show graphical representation illustrating recommended static threshold and static threshold evidence respectively for a metric under consideration in accordance with some embodiments of the present disclosure. It is shown in FIGS. 5A and 5B that the metric under consideration M1 doesn't follow a specific behavioral pattern because of which it cannot be classified to have a temporal pattern. By analyzing historical behavior and capturing the plurality of domain constraints, ST (upper) is recommended as 6000 for M1 to be optimally utilized.

Dynamic thresholds represent second case of pure temporal threshold recommendations. These are derived and recommended in cases when the metric under consideration observes significant variations across different temporal dimensions and follows a specific pattern. These patterns could either be simple such as Day of week, Day of month, Hour of day, and/or the like or could be complex patterns such as Hour of day of week, First working day of month, Last working day of month, Month of year, and/or the like.

Figure 6:
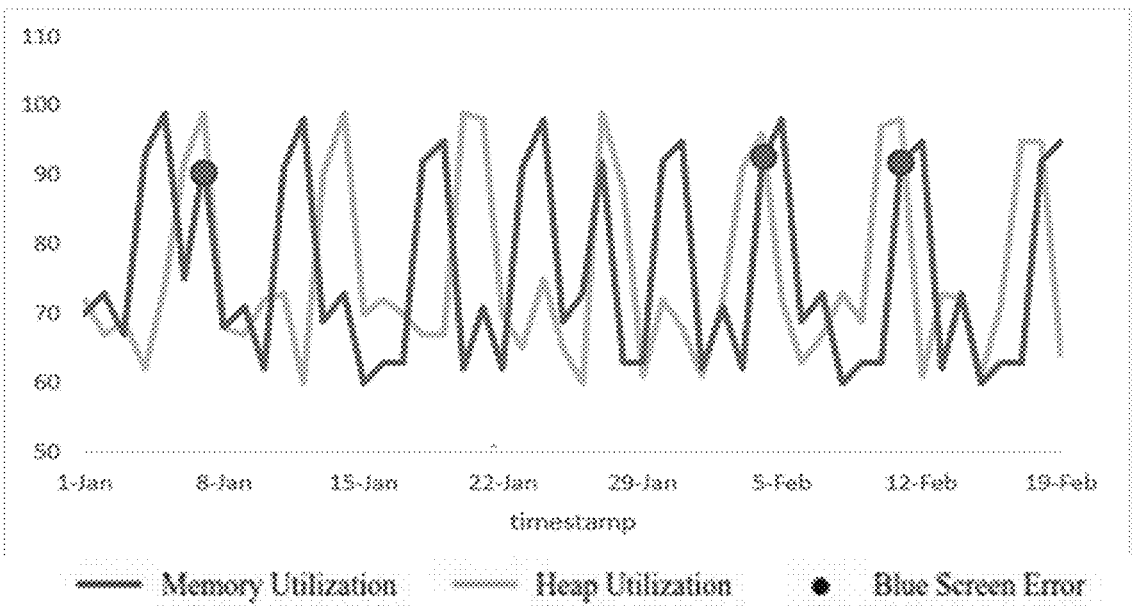
FIG. 6 shows graphical representation of an example of metrics with dynamic thresholds, in accordance with some embodiments of the present disclosure.

FIG. 6 shows graphical representation of an example of metrics with dynamic thresholds in accordance with some embodiments of the present disclosure. As shown in FIG. 6, in case of IT operations, the number of reads per minute during the peak hour of day (9 AM to 6 PM) ranges between 100 to 800 whereas during remaining period, it ranges between 100 to 300. For such cases, defining a dynamic threshold where different thresholds are defined for different dimension values are used to optimally monitor the behavior of metrics and capture deviations. In an embodiment, step of generating the dynamic threshold comprises resampling and categorizing the plurality of data into a plurality of buckets for a plurality of dimensions of the one or more temporal properties of each of the plurality of metrics related to the one or more entities in the system environment. Further, a representative value for each bucket from the plurality of buckets is computed. The representative value is computed based on a mean, and a standard deviation for each bucket from the plurality of buckets for each dimension from the plurality of dimensions. Furthermore, an intra-bucket variation (ITA) for the plurality of data and inter-bucket variation (ITR) for the representative value for each bucket from the plurality of buckets are computed as provided in equations (5) an equation (6) below:

$$ITA = \frac{1}{N(b)} \sum_{i=1}^{N(b)} \frac{\sigma(b)_i}{\mu(b)_i} \tag{5}$$

$$ITR = \max(\mu(b)) - \min(\mu(b)) \tag{6}$$

Here, N(b) represents the number of buckets, μ(b) represents the mean and σ(b) represents standard deviation of each bucket. In the present disclosure, b=<x1d(i), x2d(i), . . . , xl(i)> represents a sequence of measurement from time series X(i) for one dimension. The intra-bucket variation (ITA) captures average spread of a plurality of data points within each bucket from the plurality of buckets and the inter-bucket variation (ITR) captures variation of the plurality of data points across the plurality of dimensions.

It is observed that that some temporal properties (or patterns) might have more intrinsic variation than others. To solve this issue, the inter-bucket variation is normalized so as to bring it to the same scale across all dimensions as shown in equation (7) below:

$$ITR = \frac{ITR}{Q_{0.98} - \min(X(i))} \tag{7}$$

Here, Q refers to quantile. Based on the ITR and ITA, a score for the one or more temporal properties of each of the plurality of metrics related to the one or more entities in the system environment is generated. The score is generated in accordance with equation (8) provided below as:

$$\text{Score} = ITR - ITA - R \tag{8}$$

Based on the generated score, an optimal temporal property from the one or more temporal properties of each of the plurality of metrics related to the one or more entities in the system environment is generated. The temporal properties are assessed based on a difference between the ITR and the ITA, with a goal of maximizing (ITR−R) while minimizing the ITA, where R is minimum inter-bucket variation to consider optimal temporal property. The optimal temporal property is chosen based on its score.

In other words, generation of the dynamic threshold involves two major steps (a) mining temporal patterns (b) deriving optimal threshold for the pattern. The first step in defining dynamic thresholds is to identify temporal pattern for a given metric. Dynamic behavior of a metric is captured by capturing its variation across dimensions. Initially, the plurality of data is resampled and categorized into buckets based on dimensions of the pattern under consideration. Further, the mean $\mu^{(b)}$ and standard deviation $\sigma^{(b)}$ is computed for each bucket and the inter-bucket variation (ITR) and intra-bucket variation (ITA) are applied as first lever for pattern detection. ITA captures the average spread of data points within each bucket while ITR captures the variation of data points across all the dimensions.

Further, the dynamic threshold is generated based on the mean, the standard variation and an aggressiveness factor of each of the plurality of metrics related to the one or more entities in the system environment in accordance with the identified temporal property from the one or more temporal properties. While the first step helps to identify the optimal temporal property (i.e., the right pattern) that represents the metric, the second step helps in deriving the optimal threshold value based on derived dynamic behavior. To achieve this, first the aggressiveness factor α is determined and used together with the mean of each bucket and variation derived from pattern mining to systematically define the thresholds. Here for each dimension, the dynamic threshold (DT) is generated as provided in equation (9) and equation (10) below:

$$DT_i(\text{upper}) = \mu(b)_i + \alpha_\sigma(b)_i \forall\, i \in 1, 2, \ldots N(b) \tag{9}$$

$$DT_i(\text{lower}) = \mu(b)_i - \alpha_\sigma(b)_i \forall\, i \in 1, 2, \ldots N(b) \tag{10}$$

Once the dynamic threshold values are derived using behavioral properties of metrics, the plurality of domain constraints such as upper limit UL and lower limit LL as factored to recommend the optimal threshold value for each dimension value which are computed as provided in equation (11) and equation (12) below:

$$DT_i = \max(DT_i, LL) \,\forall\, i \in 1, 2, \ldots N(b) \tag{11}$$

$$DT_i = \min(DT_i, UL) \,\forall\, i \in 1, 2, \ldots N(b) \tag{12}$$

Figure 7A:
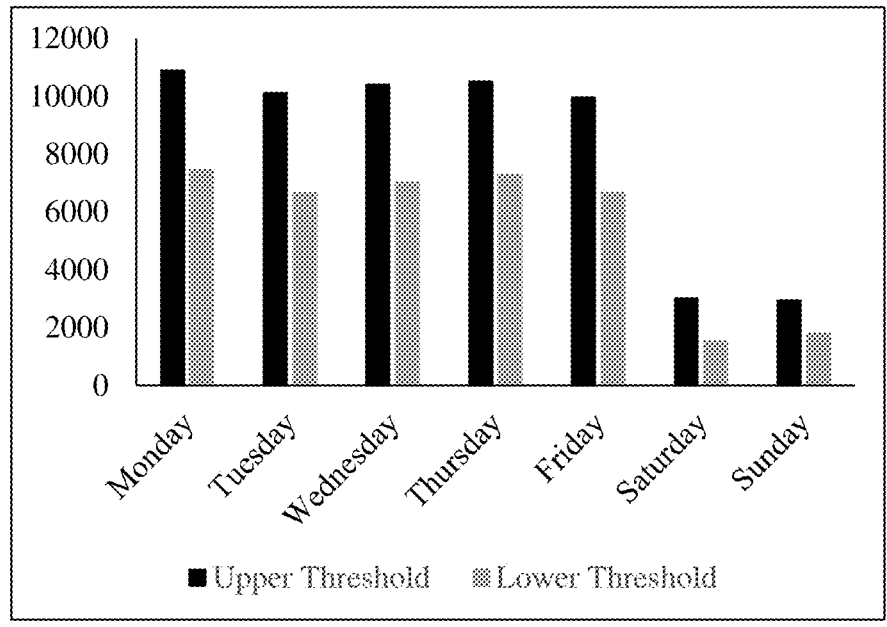
FIGS. 7A and 7B show graphical representation illustrating recommended dynamic threshold and dynamic threshold evidence respectively for a metric under consideration in accordance with some embodiments of the present disclosure.
Figure 7B:
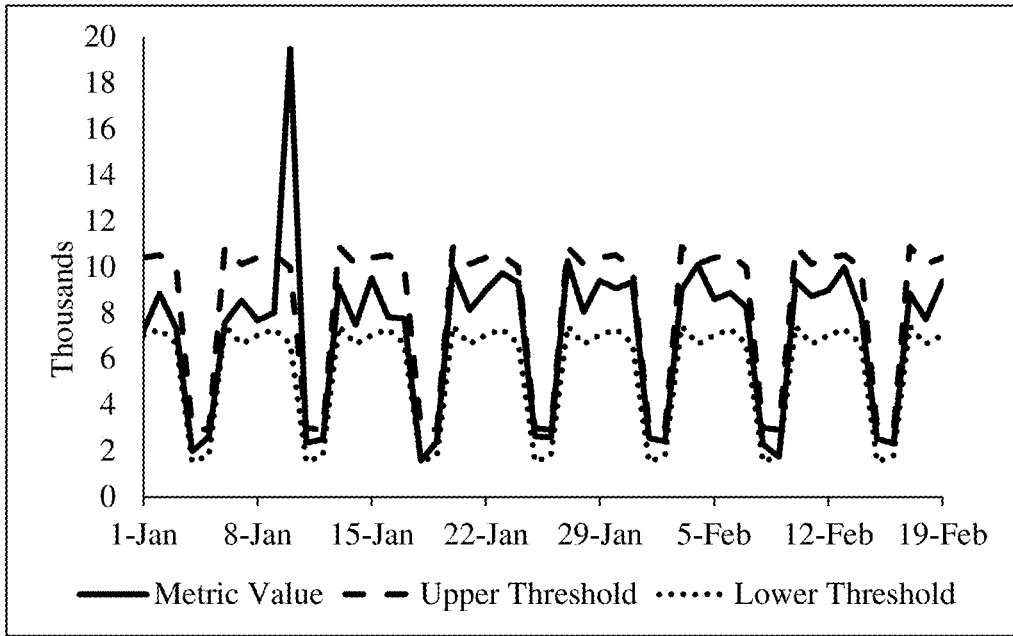

FIGS. 7A and 7B show graphical representation illustrating recommended dynamic threshold and dynamic threshold evidence respectively for a metric under consideration in accordance with some embodiments of the present disclosure. It is shown in FIGS. 7A and 7B that the recommended thresholds based on the day of week pattern mined for a metric M2 during business days (Monday to Friday) ranges between 6000 to 11000 whereas during the weekends, it ranges between 1500 to 3000.

Composite thresholds represent a case of combination of spatial-temporal threshold recommendations. These are derived and recommended in cases where the behavior of entity is influenced by both temporal and spatial aspects. For instance, when the entity under consideration does not have an associated metric but has a series of events that are influenced by other entities in the estate, that have metrics defined on them.

The step of generating the composite threshold comprises receiving, a first set of events corresponding to an entity identified from the one or more entities in the system environment with no metric. Further, an influencing relationship between a node of the identified entity and a plurality of influencing metrics corresponding to the node of the identified entity are mine using one or more data sources to define a set of spatial dependencies. Furthermore, a temporal threshold analysis is applied to each influencing metric from the plurality of influencing metrics to generate at least one of a (i) a respective static threshold, (ii) a respective dynamic threshold, and (iii) a second set of events. The second set of events are correlated with the first set of events occurring in the node of the identified entity to access a plurality of temporal correlations. The composite threshold is generated based on the plurality of temporal correlations. The plurality of temporal correlations are indicative of behavior of the plurality of influencing metrics.

In other words, by leveraging the metric behavior of its dependent entities, it becomes possible to define a threshold on the node with no metric. A configuration management database (CMDB) and other data sources are used to mine the influencing relationship between a node ns and its influencing metrics X. Information about these connections can help identify cause of occurrence of events E in the node ns that may appear unexplainable. Once the relationships are identified, the temporal threshold behavior analysis is independently applied to each influencing metric in X to define their respective thresholds and generate events E(X). The generated events are then correlated with the events of node ns to assess the impact of all the influencing metrics (X) on node (ns) in accordance with equation (13) provided below:

$$\text{Impact}\,(X(i)) = corr(E(X(i)), E(ns)) \tag{13}$$

Further, the behavior of all the influencing metrics is factored to derive a holistic equation of composite thresholds. These could either be dynamic or static. The weights w1, w2 … wn are given to the different metrics based on the Impact, given in equation (13), of the metric on a target node under consideration. The composite equation is represented by equation (14) provided below:

$$Y1 = w1X(1) + w2X(2) + w4X(4) \tag{14}$$

The equation (14) is derived using a combination of influencing metrics based on their impact on the target node and the dimension under consideration. For example, if the combination of metric X(2) and X(3) impacts the node ns, such that there is high likelihood of alert on the node if their weighted sum exceeds some limit L, a condition of raising alerts with composite threshold is defined as provided in equation (15) below:

$$\text{if } w2X(2) + w3X(3) > L_1 : \text{generate alert on node ns} \tag{15}$$

Similarly, complex conditions are derived in case when metrics of different entities impact the target node ns differently across different temporal dimension. For example, if the combination of metric X(4), X(5) and X(6) influences the node ns on weekdays and metrics X(7) and X(8) influence the node ns on weekends, then the condition of raising alerts with composite threshold is defined as provided in equation (16) and equation (17) below:

$$\text{if Weekday and } w4X(4) + w5X(5) + w6X(6) > \tag{16}$$
$$L_2 : \text{generate alert on node ns}$$

$$\text{if Weekend and } w7X(7) + w8X(8) > L_3 : \text{generate alert on node ns} \tag{17}$$

Figure 8:
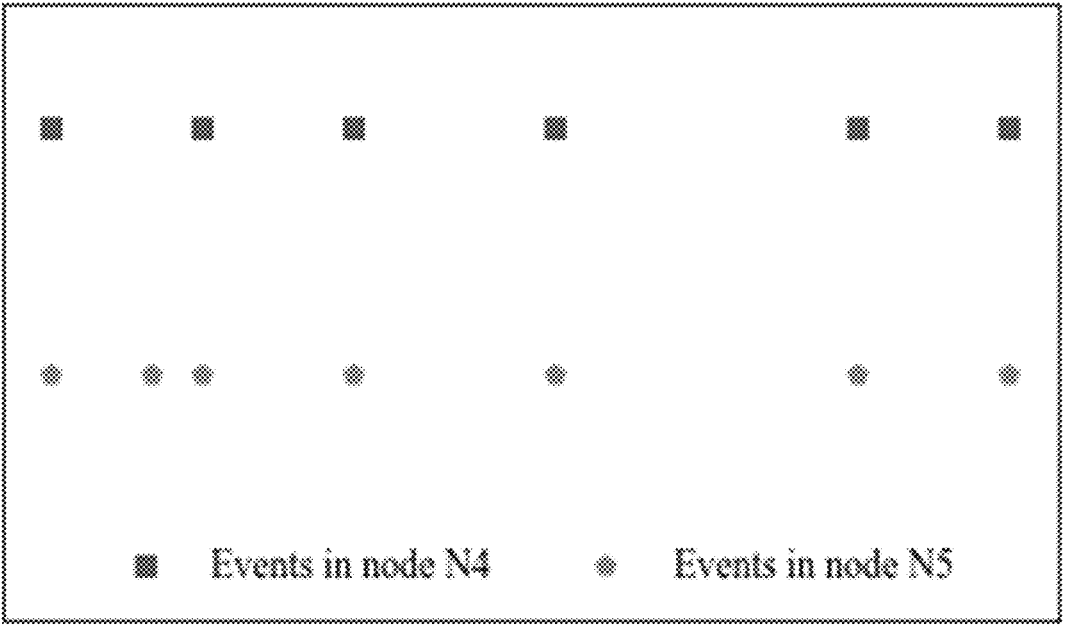
FIG. 8 show graphical representation illustrating correlation between events on two nodes (N4 and N5) under consideration in accordance with some embodiments of the present disclosure.

This enables defining the threshold on node (ns) not individually but as a derivative of all its influencing metrics. FIG. 8 show graphical representation illustrating correlation between events on two nodes (N4 and N5) under consideration in accordance with some embodiments of the present disclosure. As depicted in FIG. 8, anomalous events of Node N4 are highly correlated with the events E5 of Node N5, such that whenever an event occurs in Node N4 there is always a corresponding event in Node N5. As result, the Impact of N4 on N5 is 1 and threshold is defined on Node 5.

Referring to FIG. 2, at step 208 of FIG. 2, the one or more hardware processors 104 are configured to detect one or more anomalies in the received plurality of data when a value of the generated at least one of (a) the static threshold, (b) the dynamic threshold, and (c) the composite threshold is exceeded to a predefined value. For example, if a metric underlying an entity is CPU Utilization and the metric was detected with the static threshold of 80, then all instances of the CPU Utilization where the value crosses 80 are detected as anomalies. This indicates that an anomaly is detected in a system when the threshold value of a metric under consideration is exceeded the predefined value for a specific use case leading to abnormal behavior of the components of the system. The predefined value may vary in accordance with varying scenarios and use cases.

Further, at step 210 of FIG. 2, the one or more hardware processors 104 are configured to adaptively updating, via the one or more hardware processors, the one or more models to the at least one of (i) the one or more temporal properties, and (ii) the one or more spatio-temporal properties of each of the plurality of metrics related to the one or more entities in the system environment based on at least one of (a) a self-learning mechanism, and (b) a self-tuning mechanism. The present disclosure generates either static, dynamic, or composite thresholds for metrics based on their temporal behavior, influencer relationship, and domain constraints. But considering that IT estates are inherently complex and dynamic in nature, fine tuning the analysis and repeating a process requires immense time and effort. This is resolved by using the self-learning mechanism, and the self-tuning mechanism that allow the one or more models to self-learn and self-tune by adapting themselves to the dynamic behavior of the estate and user feedback.

The self-learning mechanism comprises first generating, a plurality of clusters of the plurality of metrics related to the one or more entities based on a plurality of metric properties. Further, a set of representative metrics is identified for each cluster from the plurality of clusters of the plurality of metrics based on a similarity in the plurality of metric properties. For each representative metric from the set of representative metrics for each cluster from the plurality of clusters of the plurality of metrics, at least one of (i) a plurality of optimal static thresholds, (ii) a plurality of optimal dynamic thresholds, and (iii) a plurality of optimal composite thresholds across varying degree of aggressiveness are generated. Further, an optimal threshold from the at least one of (i) the plurality of optimal static thresholds, (ii) the plurality of optimal dynamic thresholds, and (iii) the plurality of optimal composite thresholds is selected by applying one or more inputs obtained as feedback from one or more users on each of the set of representative metrics for each cluster from the plurality of clusters of the plurality of metrics. The optimal threshold indicates a best threshold. The one or more inputs obtained as the feedback from the one or more users may include but not limited to user's preferred dimensions, user-defined threshold and user's preferred aggressiveness factor. Based on the one or more inputs obtained as the feedback from the one or more users on each cluster from the plurality of clusters of the plurality of metrics, a change may occur in one or more parameters associated with the plurality of metrics related to the one or more entities in the system environment. The one or more parameters may include but not limited to a temporal pattern, level of aggressiveness, intra-bucket variation (ITA), inter-bucket variation (ITR), and the score generated using ITA and ITR. The change in the one or more parameters associated with the plurality of metrics related to the one or more entities in the system environment is determined. The system of the present disclosure is capable of self-learning, the one or more parameters associated with the plurality of metrics in accordance with the one or more inputs obtained as the feedback from the one or more users and replicate the learning on each of the plurality of metrics related to the one or more entities in the system environment.

The self the self-tuning mechanism comprises obtaining, a plurality of real time delta data corresponding to the one or more entities and a set of metrics related to the one or more entities in the system environment for the plurality of real time delta data. The real time delta data represents data of short duration such as 1 week or 10 days. The set of metrics is determined for the plurality of real time delta data and is different from the plurality of metrics which are considered for the plurality of data assumed as historical data. Further, the temporal analysis is performed on the set of plurality of metrics related to the one or more entities in the system environment for the plurality of real time delta data. As a first step for temporal analysis, a plurality of clusters of the set of metrics related to the one or more entities in the system environment for the plurality of real time delta data are generated based on the plurality of metric properties. Further, a representative metric is identified for each cluster from the plurality of clusters of the set of metrics based on a similarity in the plurality of metric properties. Then, at least one of (i) a plurality of optimal static thresholds, (ii) a plurality of optimal dynamic thresholds, and (iii) a plurality of optimal composite thresholds is generated across varying degree of aggressiveness for the representative metric for each cluster from the plurality of clusters of the set of metrics. Upon performing the temporal analysis, a change is determined in the one or more parameters associated with the set of metrics related to the one or more entities in the system environment for the plurality of real time delta data. When there is a change, the system of the present disclosure self-tunes itself by auto-optimizing the one or more parameters associated with the set of metrics based on (a) the self-learning of the one or more parameters associated with the plurality of metrics and (b) the temporal analysis performed on the set of plurality of metrics related to the one or more entities in the system environment for the plurality of real-time delta data.

The step 210 is further illustrated and better understood by way of following exemplary explanation.

To capture the tacit knowledge of the experts and adapt accordingly, the self-learning mechanism is provided to learn and adapt based on user-feedback. In the first step, the properties of metrics such as measure of central tendency, trends, temporal patterns, and spatial aspects such as entity type, its dependencies, are factored to find group of similar entities and metrics. Further, a set of representative metrics corresponding to each identified group is identified as the metric that shows a strong correlation with all other metrics in the group. This helps in reducing sample feedback set from a group of all metrics in an estate to a small set of representative metrics thereby making it easier to take user feedback. Furthermore, for each representative metric from the set of representative metrics, multiple types of thresholds ranging from best dynamic to static to composite across varying degree of aggressiveness are generated. Based on the user feedback on the set of representative metrics, user's preferred dimensions and user's preferred aggressiveness factor are learnt. Insights obtained are then replicated on superset of measures. Goal of user feedback is to accommodate domain expert's tacit knowledge. There are constraints in place to prevent any counterintuitive feedback that does not consider the metric's past behavior.

Figure 9A:
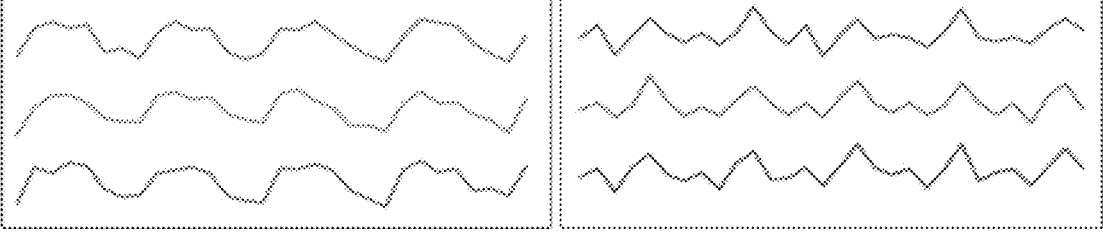
FIGS. 9A through 9C show graphical representations illustrating an example of self-learning mechanism in accordance with some embodiments of the present disclosure.
Figure 9B:
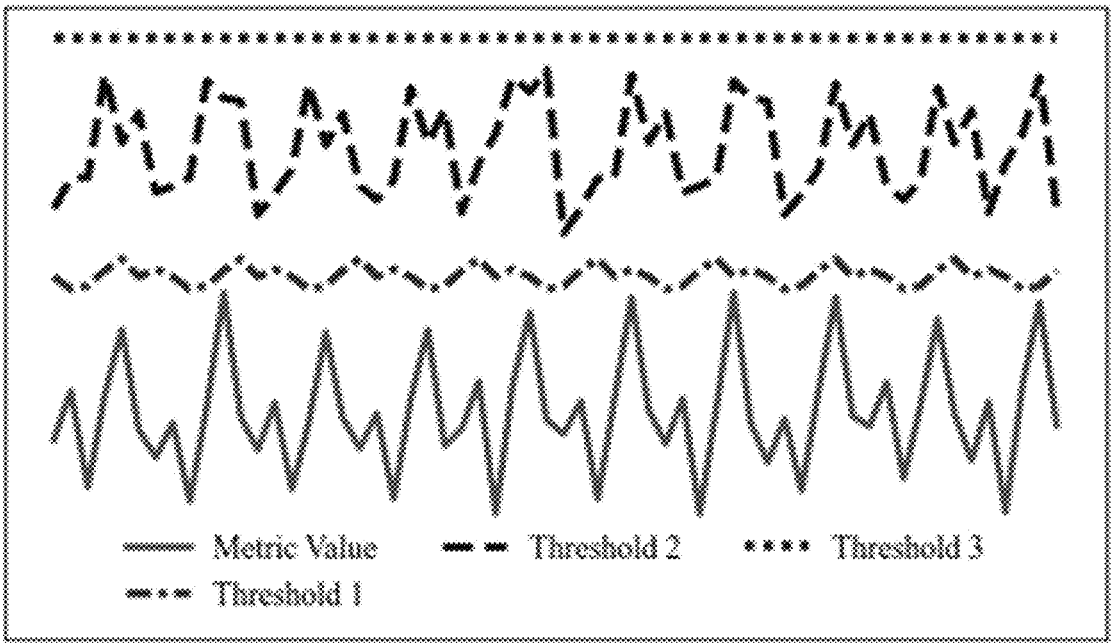
Figure 9C:
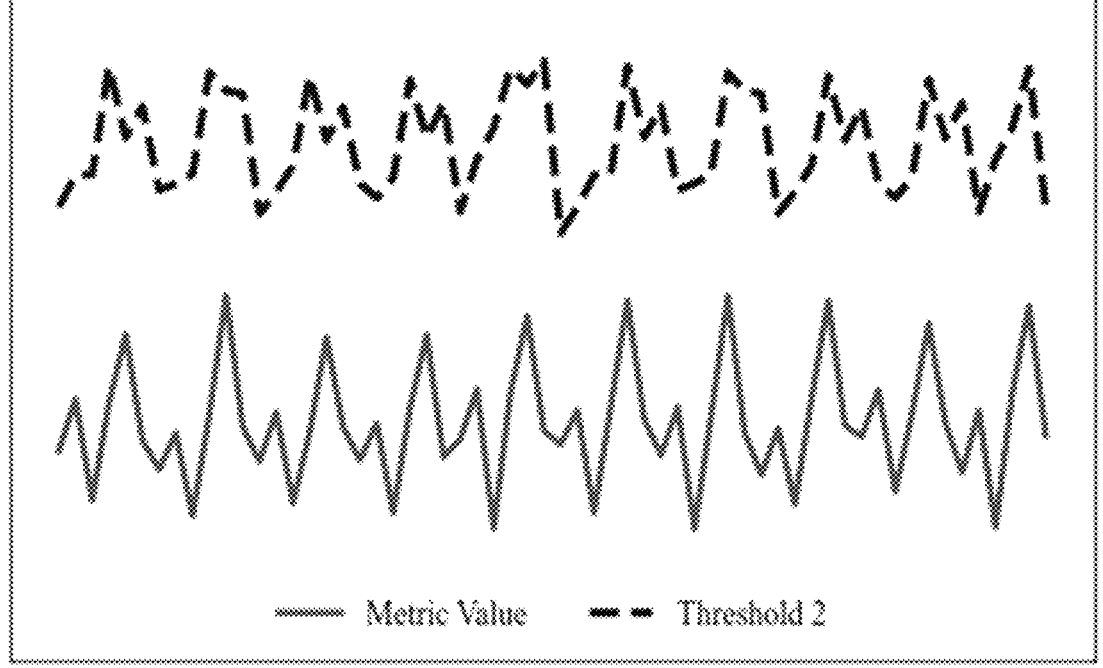

FIGS. 9A through 9C show graphical representations illustrating an example of self-learning mechanism in accordance with some embodiments of the present disclosure. It is shown in FIG. 9A that the metrics M5-M10 are clustered into 2 groups (C1, C2) based on their metric properties. The set of representative metrics (R1-R2) is defined for each unique cluster. As shown in FIG. 9B, cluster C1 and the representative metric R1 are considered and thresholds across different patterns and level of aggressiveness are generated. Finally, as shown in FIG. 9C, Threshold 2 is selected as new optimal threshold based on user feedback. Learning about the user preferred parameters (i.e., pattern and level of aggressiveness) is replicated to all metrics of cluster C1.

The self-tuning mechanism involves automatically optimizing the one or more parameters and enhancing the analysis based on most recent data properties rather than executing complete analysis again. In the self-tuning mechanism, group of similar metrics are found and their corresponding set of representative metrics re identified. For a metric, the data obtained recently and in real time is referred to as real time delta data (also referred as delta data), whilst data on which the threshold analysis ran is referred to as historical data. The statistics derived from previous run of temporal behavior analysis is combined with the statistics of the real time delta data. The mean and standard deviation for each dimension are recomputed as provided in equation (17) and equation (18) below:

$$\mu(c)_i = \frac{\mu(b)_i N_h + \mu(d)_i N_d}{N_h + N_d} \quad \forall\, i \in 1, 2, \dots\, N(b) \tag{17}$$

$$\sigma(c)_i = \sqrt{\frac{\sigma(b)_i(N_h - 1) + \sigma(d)_i(N_h - 1) + \dfrac{N_h N_d}{N_h + N_d}(\mu(b)_i - \mu(d)_i)^2}{N_h + N_d - 1}} \quad \forall\, i \in 1, 2, \dots\, N(b) \tag{18}$$

Here, $\mu(c)$, $\mu(b)$, and $\mu(d)$, are combined mean, historical data mean and delta data mean respectively, and $\sigma(c)$, $\sigma(b)$, and $\sigma(d)$, are combined standard deviation, historical data standard deviation and delta data standard deviation respectively. $N_h$ and $N_d$ denote total data points in historical and delta data, respectively.

Further, multiple thresholds are generated for a metric across different patterns and ranging from moderate to aggressive based on a value of dynamic aggressiveness factor ad and global aggressiveness factor. A lower value of aggressiveness factor produces compact thresholds and a higher value of aggressiveness factor produces more relaxed thresholds. For each unique combination of pattern and level of aggressiveness, intra-bucket variation (ITA), and inter-bucket variation (ITR), are computed and a score is generated. This is used to detect any changes in the pattern. For thresholds generated in previous step, the best of the lot is selected. The learning about the pattern and aggressiveness factor from this is extended to other entities of an estate using similarity in entities and metric properties.

Figure 10A:
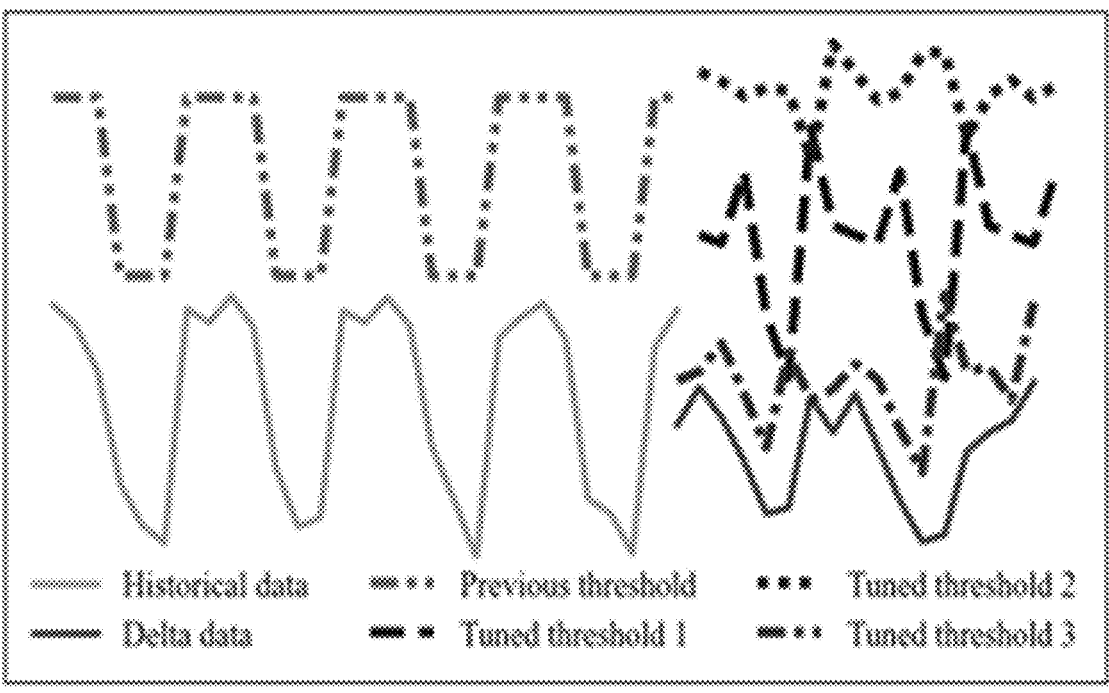
FIGS. 10A and 10B show graphical representations illustrating an example of self-tuning mechanism in accordance with some embodiments of the present disclosure.
Figure 10B:
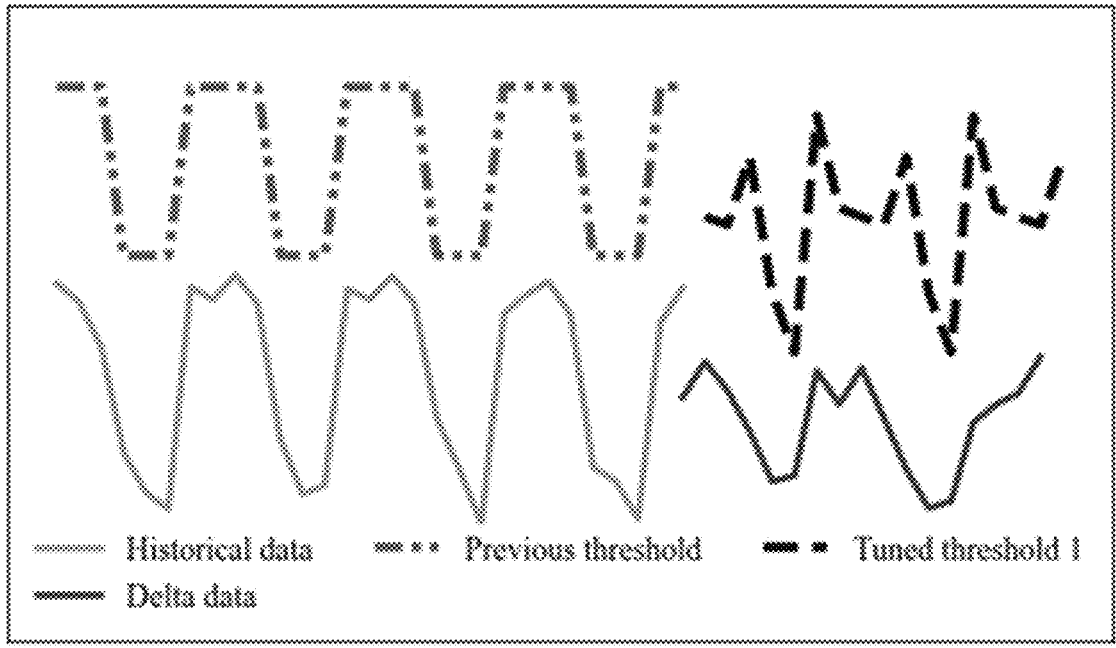
Figure 11A:
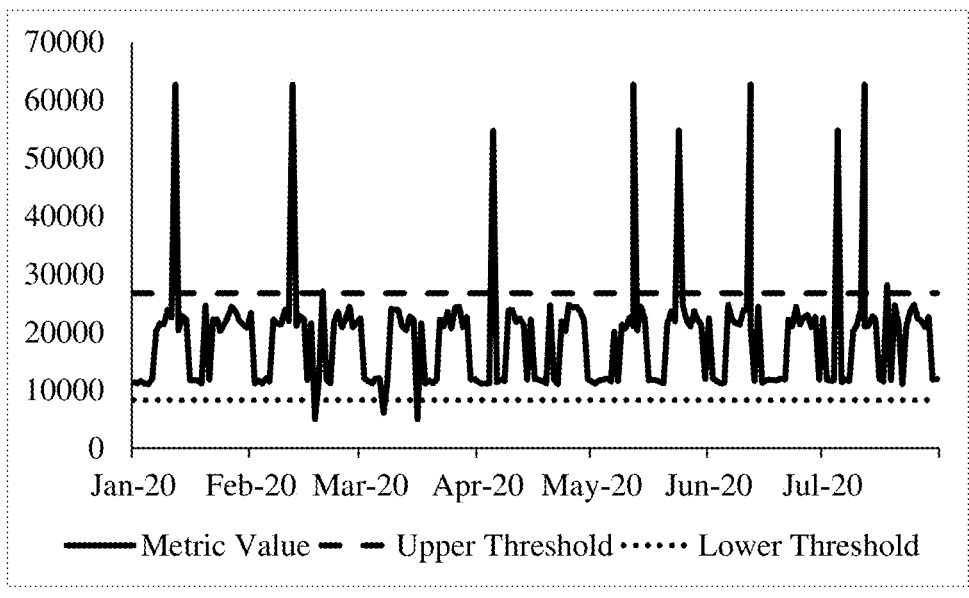
FIGS. 11A through 11F provides graphical representations that depict time series showing runtime metric and generated thresholds (static and dynamic) for Job 1, Job2 and Job 3 respectively, according to some embodiment of the present disclosure.
Figure 11B:
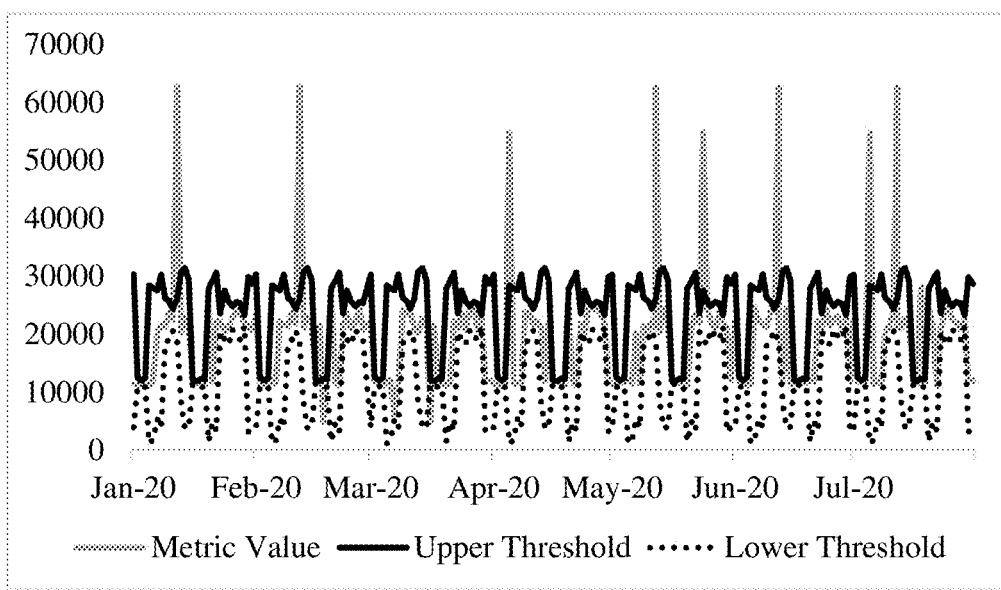
Figure 11C:
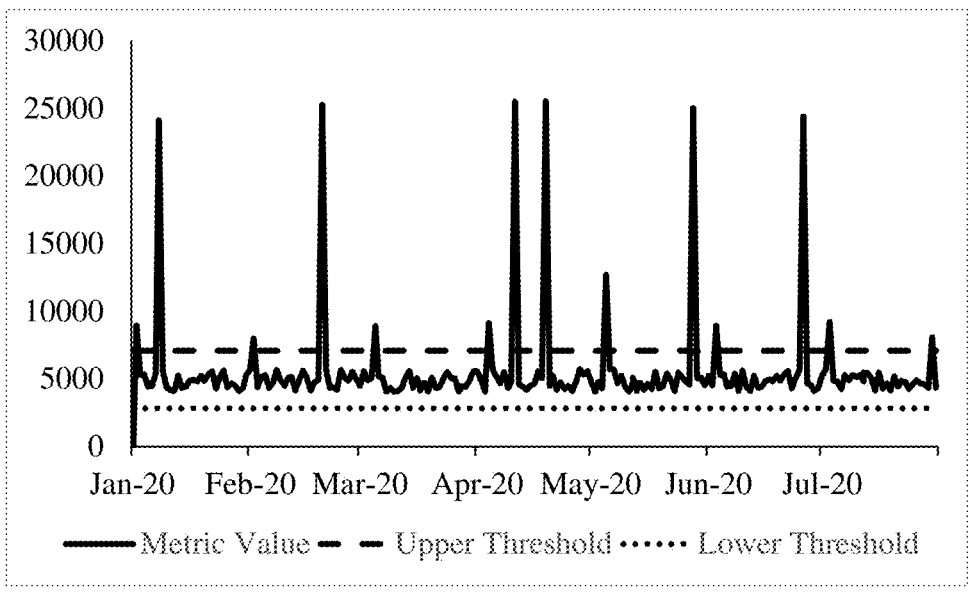
Figure 11D:
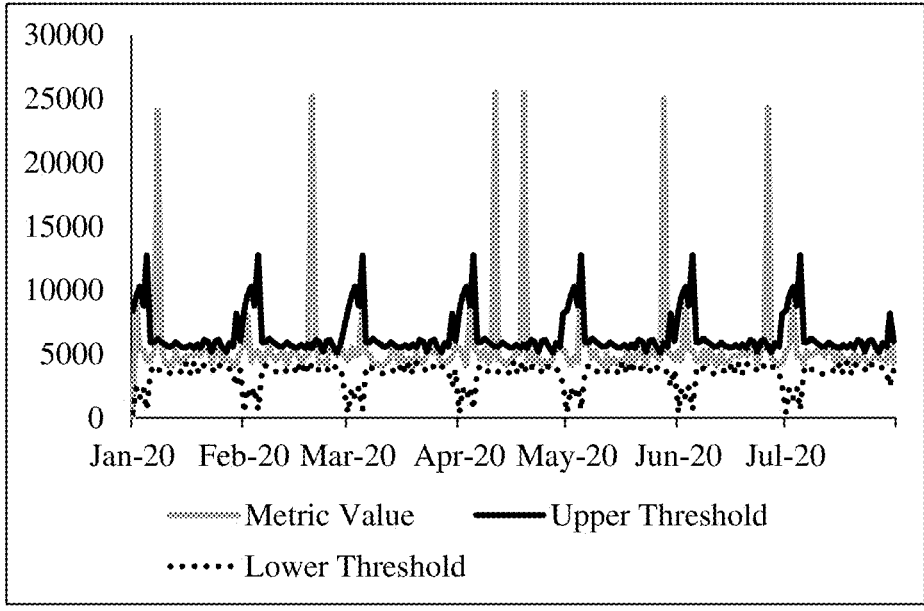
Figure 11E:
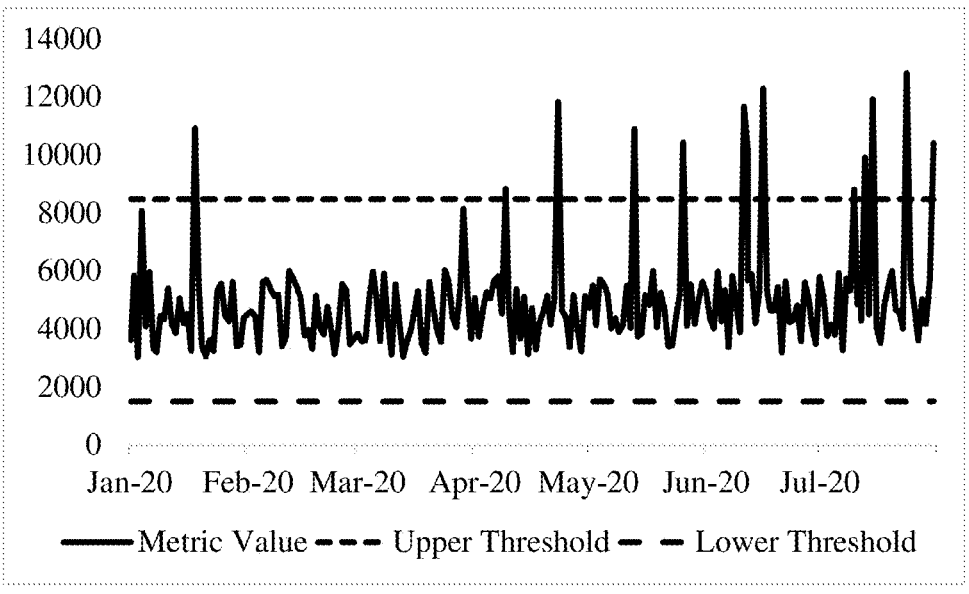
Figure 11F:
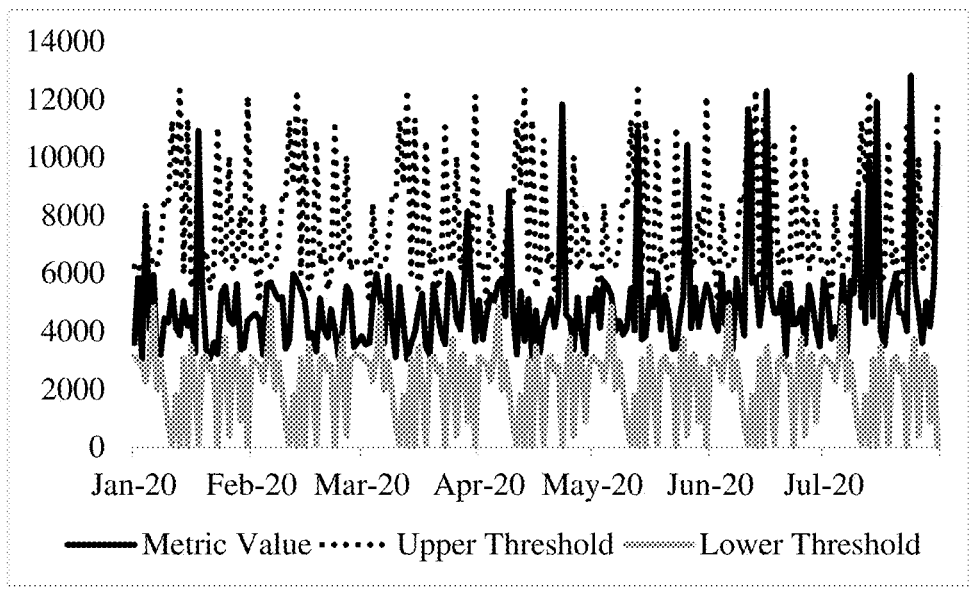

FIGS. 10A and 10B show graphical representations illustrating an example of self-tuning mechanism in accordance with some embodiments of the present disclosure. FIG. 10A shows the historical data and the real time delta data for representative metric R2 of cluster C2. As shown in FIG. 10A, thresholds across different patterns and different level of aggressiveness are generated. The score, given in equation (8) is computed for all combinations and one with best score is selected. FIG. 10B shows that tuned threshold 1 is selected as new optimal threshold. The learning about new optimized parameters (pattern and level of aggressiveness) is replicated to all metrics of cluster C2.

In an embodiment, the one or more hardware processors 104 are further configured to continuously monitor, a mismatch between the generated at least one of (a) the static threshold, (b) the dynamic threshold, and (c) the composite threshold with a pre-determined threshold and recommending, a corrected threshold when a mismatch between the generated at least one of (a) the static threshold, (b) the dynamic threshold, and (c) the composite threshold and the pre-determined threshold is detected. The predetermined threshold could be a user define threshold or a threshold generated in previous run. Further, newly generated thresholds are compared with thresholds generated in previous run to obtain the corrected threshold. Best out of static, dynamic and composite thresholds generated in previous steps are compared with pre-determined threshold. For example, if the user defined threshold or previously generated threshold for a metric is static and its value is 80, and if newly generated threshold deviates from 80 or if it has changed to dynamic, then that is considered as a mismatch. If mismatch is found, the generated thresholds are set as new baseline for a metric.

Experimental Evaluation

In the present disclosure, experimental evaluations are reported and it is observed that the method of the present disclosure yields promising results and can be successfully applied to several datasets with different characteristics. To evaluate the effectiveness of the method of the present disclosure, different metric time-series datasets have been selected. Most of them have been annotated by domain experts for anomaly detection. In addition to this, events time-series data and dependency data are selected to evaluate the case of composite thresholds. The following datasets were used for performing four different experiments.

Dataset 1: a multivariate time-series dataset containing runtime metric of three different jobs (Job 1, Job 2 and Job 3) running on a server. Point anomalies have been labeled by domain experts. Timestamps for all three metric have a day-level granularity. The metrics cover a period of 7 months, 215 data points where, where 6.5%, 3.7%, 7% are anomalies in runtime metrics of Job 1, Job 2 and Job 3 respectively. Job 1 has a strong Day of Month pattern; Job 2 observes a weak Day of Month pattern while Job 3 has no visible pattern.

Dataset 2: This dataset contains events log of CPU and heap utilization of a node. Metric is available only for CPU utilization. Anomalies have been labeled by domain experts based on events log of the server. The data covers a period of 13 months, 404 data points, where 6.2% are anomalies.

Dataset 3: This dataset consists of a synthetic univariate time series with 8784 timestamps spread across a 12-month period. The timestamps have an hour level granularity. The point anomalies were introduced to data at random. Anomalies affect 1.23% of the data, or around 120 data points.

Dataset 4: A univariate time-series dataset containing URL Response time of a server. The anomalies are labeled by domain experts. The timestamps have a day-level granularity. The data covers a period of 13 months, 404 data points where, where 6.2% are anomalies. The data contains change point anomalies where the mean and standard deviation of the metric changes.

Evaluation criteria: To evaluate the method of the present disclosure, following metrics have been taken into consideration:

a. Precision: Fraction of relevant instances among the retrieved instances.

$$Precision = \frac{True\ Positive}{True\ Positive + False\ Positive}$$

b. Recall: Fraction of relevant instances that were retrieved.

$$Recall = \frac{True\ Positive}{True\ Positive + False\ Negative}$$

c. F1-score: Combines the precision and recall of a classifier into a single metric by taking their harmonic mean.

$$F1\ score = \frac{2.precision.recall}{precision + recall}$$

Implementation details: The method of the present disclosure is implemented in Python 3.6 using NumPy, Pandas, and Raptures libraries. A computer with Intel® Core™ i5-10310U CPU, 4 cores, 16 GB RAM is used to conduct all experiments.

Experimental Results

Experiment 1: For the first experiment, sensitivity of the method of the present disclosure to pattern strength and parameter a in equations (1), (2), (9), and (10) is examined. Threshold analysis was executed on Dataset 1. FIGS. 11A through 11F provides graphical representations that depict time series showing runtime metric and generated thresholds (static and dynamic) for Job 1, Job2 and Job 3 respectively, according to some embodiment of the present disclosure. Table 1 below shows evaluation score for pattern strength and parameter tuning.

TABLE 1

| | Alert Count | Precision | Recall | F1 score |
|---|---|---|---|---|
| Job 1 Strong pattern | | | | |
| Static (α = 1.5) | 15 | 0.53 | 1 | 0.7 |
| Static (α = 2) | 13 | 0.62 | 1 | 0.76 |
| Static (α = 2.5) | 11 | 0.73 | 1 | 0.84 |
| Dynamic (α = 1.5) | 14 | 0.57 | 1 | 0.73 |
| Dynamic (α = 2) | 10 | 0.82 | 1 | 0.9 |
| Dynamic (α = 2.5) | 6 | 1 | 0.75 | 0.86 |
| Job 2 Weak pattern | | | | |
| Static (α = 1.5) | 13 | 0.93 | 0.86 | 0.89 |
| Static (α = 2) | 11 | 1 | 0.78 | 0.88 |
| Static (α = 2.5) | 8 | 1 | 0.57 | 0.72 |
| Dynamic (α = 1.5) | 15 | 0.93 | 1 | 0.97 |
| Dynamic (α = 2) | 13 | 1 | 0.93 | 0.97 |
| Dynamic (α = 2.5) | 12 | 1 | 0.86 | 0.92 |

TABLE 1-continued

| | Alert Count | Precision | Recall | F1 score |
|---|---|---|---|---|
| Job 3 No pattern | | | | |
| Static (α = 1.5) | 15 | 0.89 | 1 | 0.94 |
| Static (α = 2) | 15 | 1 | 1 | 1 |
| Static (α = 2.5) | 14 | 1 | 0.89 | 0.94 |
| Dynamic (α = 1.5) | 16 | 0.62 | 0.67 | 0.65 |
| Dynamic (α = 2) | 10 | 1 | 0.62 | 0.76 |
| Dynamic (α = 2.5) | 5 | 1 | 0.45 | 0.62 |

It is observed from Table 1 that for data with a strong pattern, dynamic thresholds perform exceptionally well (e.g., Job 1 shown in Table 1). As the pattern's strength decreases, the dynamic threshold may begin to over-fit, particularly in the case of data with no discernible pattern (e.g., Job 3 shown in Table 1). In such circumstances, it is best to employ static thresholds. Further, it sis observe that setting the alpha parameter a to a higher value result in more relaxed thresholds. This may improve precision by generating fewer false positive alerts, as seen for Job 1 in Table 1, but it might also decrease recall because few true positives could well be missed due to the higher threshold value, as illustrated for Job2 in Table 1. In most cases, setting the alpha to an optimal value of 2 yields the best results.

Figure 12:
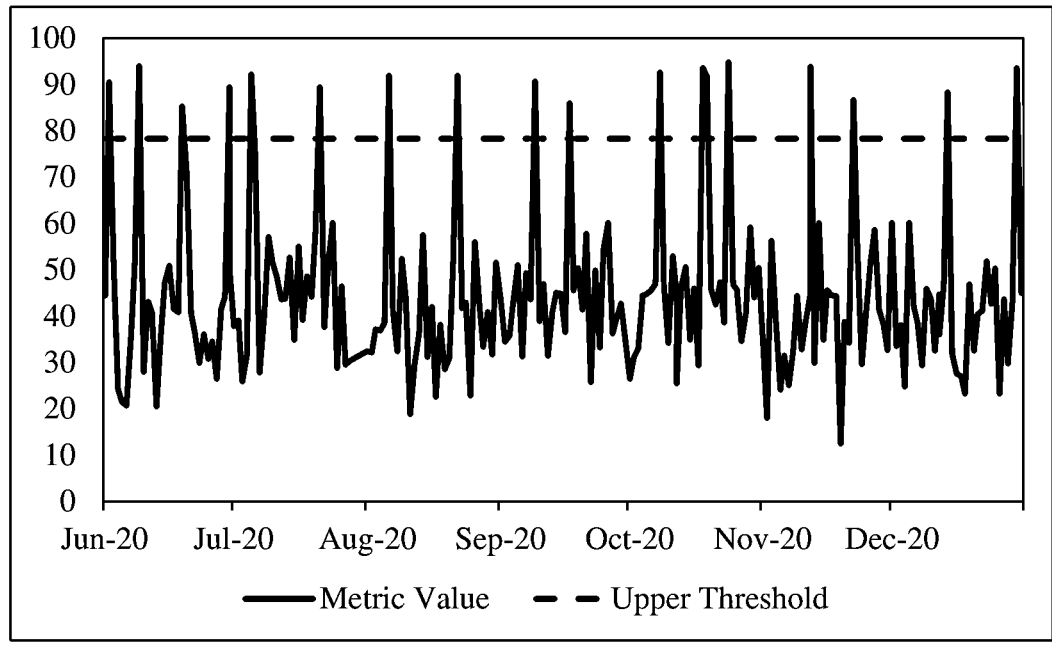
FIG. 12 provides a graphical representation that shows the anomalous events obtained from the threshold analysis performed on CPU Utilization metric according to some embodiment of the present disclosure.
Figure 13:
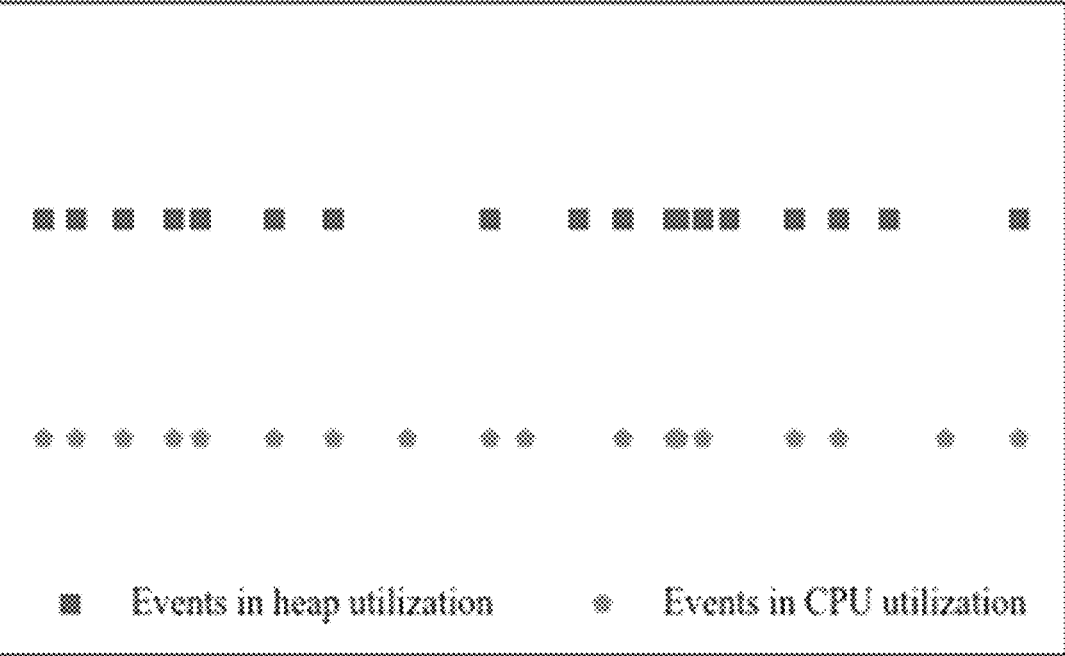
FIG. 13 provides a graphical representation illustrating the correlation of the anomalous events with the events on Heap Utilization according to some embodiment of the present disclosure.

Experiment 2: In this experiment, efficacy of a composite threshold is investigated for nodes where the entity under consideration does not have metrics but does have events. The experiment was carried out on Dataset 2. First the threshold analysis was performed on CPU Utilization metric to get the anomalous events. FIG. 12 provides a graphical representation that shows the anomalous events obtained from the threshold analysis performed on CPU Utilization metric according to some embodiment of the present disclosure. These anomalous events were then correlated with the events on Heap Utilization to quantify impact, build a composite threshold and get anomalies. FIG. 13 provides a graphical representation illustrating the correlation of the anomalous events with the events on Heap Utilization according to some embodiment of the present disclosure. It is observed from FIG. 13 that the alerts generated by composite thresholds were compared against the events data of Heap Utilization and the precision, recall, and F1 score were calculated. Table 2 below provides evaluation results for experiment 2.

TABLE 2

| Composite Thresholds | Alert Coverage | Precision | Recall | F1 score |
|---|---|---|---|---|
| Heap Utilization | 90% | 0.95 | 0.9 | 0.92 |

In Table 2, a 90% alert coverage on heap utilization is observed when using the composite thresholds. Further, high precision and recall score are observed in Table 2 that demonstrate the efficacy of the method of the present disclosure.

Figure 14:
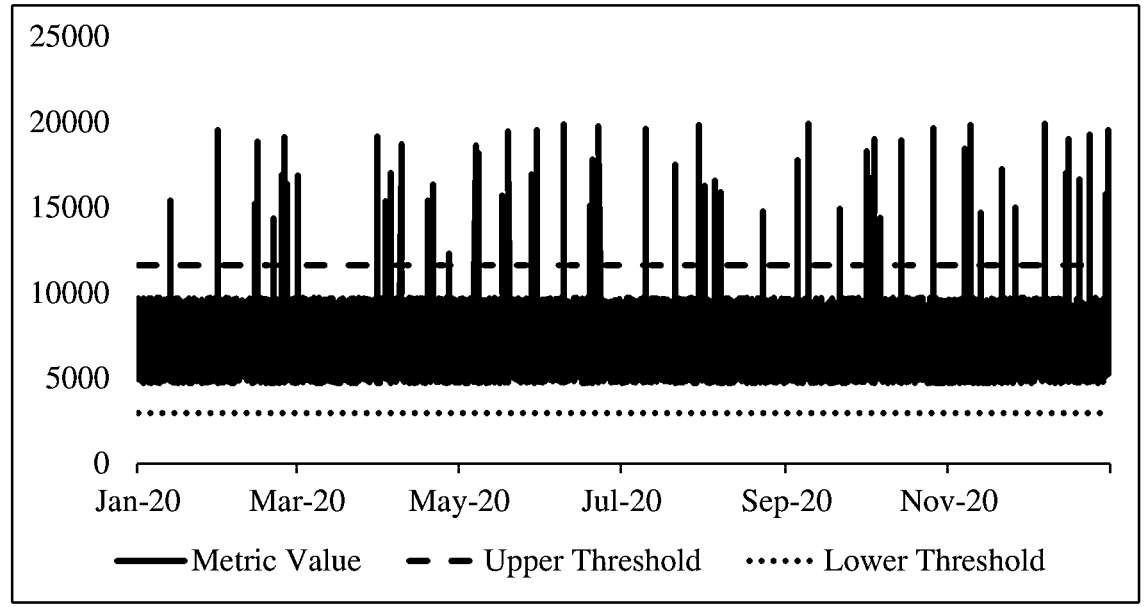
FIG. 14 provides a graphical representation that shows metric and threshold data for dataset 3, according to some embodiment of the present disclosure.

Experiment 3: In this experiment, it is demonstrated how incremental analysis improves analysis performance with minimal to no information loss. The experiment was carried out on Dataset 3. FIG. 14 provides a graphical representation that shows metric and threshold data for dataset 3, according to some embodiment of the present disclosure. The data was divided into three datasets with window sizes of three months, six months, and one year. The threshold analysis was performed on all three datasets, while the incremental analysis was performed on the last 30% of the three datasets. The computation time of simple threshold and incremental threshold analysis were computed against the three derived datasets. Table 3 below provides results of computation time of simple threshold and incremental threshold analysis computed against the three derived datasets.

| Computation | Simple threshold analysis | | | Incremental analysis | | | |
|---|---|---|---|---|---|---|---|
| Time Comparison | Threshold range | Alerts Count | Compute time (Secs) | Threshold range | Alerts count | Compute time (Secs) | Compute time decreased by |
| Total data: 3 months Incremental analysis on last 1 | 11957.99-2744.91 | 38 | 0.71 | 11958.00- | 38 | 0.29 | 59% |
| Total data: 6 months Incremental analysis on last 2 | 11778.27-2835.12 | 64 | 0.86 | 11778.26-2835.11 | 64 | 0.36 | 59% |
| Total data: 1 year Incremental analysis on last 4 months | 11598.25-2943.2 | 108 | 0.91 | 11598.25-2943.2 | 108 | 0.41 | 55% |

Table 3 shows 55-60% reduction in computation time of incremental threshold compared to simple threshold analysis. Also, no noticeable loss of information in terms of alerts and derived thresholds is observed.

Figure 15:
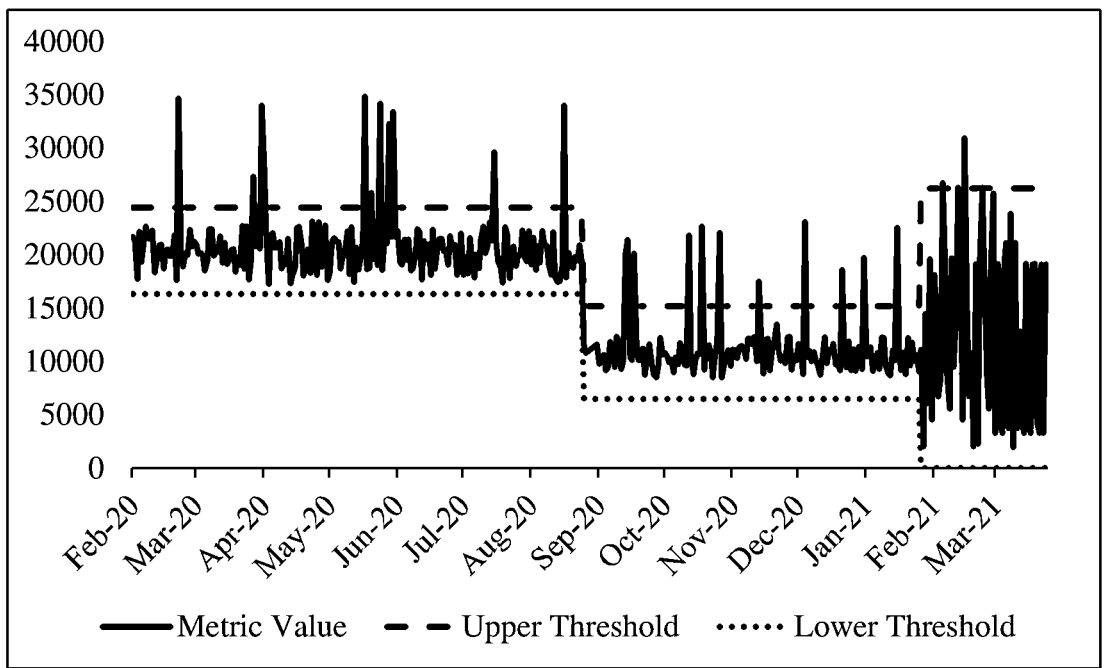
FIG. 15 provides a graphical representation that shows generated thresholds (upper and lower) for a time series data representing URL response time metric and threshold for dataset 4, according to some embodiment of the present disclosure.

Experiment 4: In this experiment, effectiveness of recommended threshold is investigated when there are abrupt changes in mean or standard deviation of the data. The time series depicted in FIG. 12 and FIG. 13 show Dataset 4. It is observed that there are two persistent changes visible in the time series data, the first being a change in mean and second a change in standard deviation. The threshold analysis was run on the data. FIG. 15 provides a graphical representation that shows generated thresholds (upper and lower) for a time series data representing URL response time metric and threshold for dataset 4, according to some embodiment of the present disclosure. The precision, recall, and F1 score of alerts generated by thresholds before and after each change-point are calculated and provided in Table 4 below.

TABLE 4

| Change-point | Before | | | After | | |
|---|---|---|---|---|---|---|
| Analysis | Precision | Recall | F1 | Precision | Recall | F1 |
| Change in mean | 0.82 | 0.9 | 0.86 | 0.89 | 0.81 | 0.85 |
| Change in Standard dev. | 1 | 0.73 | 0.85 | 0.92 | 0.74 | 0.82 |

It is observed from Table 4 that the method of present disclosure detected abrupt changes and adjusted the thresholds accordingly. Further, introduction of the change-point had no discernible impact on precision, recall, or F1 score.

The present disclosure is further better understood by way of an illustration which represents an application of the method and system of the present disclosure. The case study discusses about a leading American retailer with over 200 stores across different geographies. The American retailer was experiencing major business continuity issues owing to inaccurately defined service level agreements (SLAs) for assessing the behavior of their business-critical processes. While on the one hand, these inaccurately defined SLAs led to generation of false alerts and escalations that were eventually identified as inconsequential, on the other hand, it led to missing out on genuine anomalies and outages which were diagnosed later but led to business outages. The discrepancy in accurately monitoring and evaluating the behavior of business-critical processes resulted in delay in generating inventory reports across different stores, discrepancies in restocking goods, generating price tags, creating daily stock reports, and/or the like. This led to missed sales opportunities and loss of revenue. IT estate of the American retailer was a complex one with 20,000+ jobs spread across 5 lines of businesses, that were responsible for carrying out diverse set of business processes across different verticals. On a general day, it was observed that the smooth functioning of the processes and maintenance of business activities relied on timely execution and completion of around 60 business critical jobs. Any delay or discrepancy in accurately capturing these anomalies led to business outages and hindered business continuity. Hence it became utmost important to first derive the normal operating baseline of the metrics associated to these critical jobs, capture even the slightest of deviations, and efficiently notify the operations team about it. The method of the present disclosure was applied on their dataset, the historical behavior of the business-critical jobs was assessed, and two different cases of insights were identified which includes (a) Cases where the defined SLAs were set too aggressive and too close to the normal behavior resulting in generation of false alerts in cases of even slight deviations (b) Cases where the defined SLAs were set too conservative and higher than the normal behavior resulting in missing out genuine alerts and outages in cases of even significantly high deviations.

Detailed examples of some interesting insights that were derived from the case study are following:

Example 1—SLA job XXXXAVPP_____ XXXXFAVP observed 389 SLO breaches over the course of 8 months and 5326 executions, resulting in 48 breaches per month. The threshold defined on execution time of this job was 60 seconds which meant that an alert was raised every time the job executed longer than this duration. Additionally, the defined threshold was very close to the normal operating range of execution resulting in large number of false alerts being generated. On applying, the method of the present disclosure on this metric and assessing different properties, a static threshold value of 160 seconds was recommended. On using the recommendation, following changes in behavior were observed:

(i) The SLO breaches reduced to 49 with an average of 6 breaches per month.

(ii) The total noise suppression was estimated to be 92%.

Example 2—SLA job XXXXCSNP_____ XXXXTMST.1200 observed only 4 SLO breaches over the course of 8 months and 224 execution, resulting in generation of 1 alert every 2 months. The generation of few alerts initially made everything appear perfect on surface thus giving an impression of an almost smooth operation. However, in reality operations teams were facing challenges in maintaining business continuity of functions related to this job, which they were failing to accurately capture. It was found that defined threshold on the execution time of job was 1200 seconds which was much higher that its normal operating range, which resulted in genuine alerts being missed. On applying the method of the present disclosure on this metric, a temporal behavior in the execution time of metric was observed and a Day of week pattern was identified. Also, it was observed that the execution time was the highest on Saturday while it was lowest on Tuesdays and dynamic thresholds were recommended between 230 to 550 for different days of the week. On using the recommendations, following changes in behavior were observed:

(i) The SLO breaches increased to 17 with an average of 2 breaches per month (ii) This led to a 4 times increase in the anomalies generated and resulted in accurate monitoring of metrics.

Thus, the method of the present disclosure helped in solving two major problems. For cases where the thresholds were set too aggressively and close to the normal operating region, false alerts that were getting captured were reduce and noise that was generated by 85% was suppressed. For cases where the thresholds were set too conservatively and significantly higher than the normal operating region, 256 SLA breaches that were initially getting missed were accurately captured.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The present disclosure provides a method to self-learn the thresholds to derive normal behavior of every component of a system environment by analyzing its various properties. The disclosed method and system self-learn on a constant basis in order to adapt to business and technological changes. The disclosed method and system also learn and adapt based on user feedback to accommodate the tacit knowledge of domain experts. More importantly, the problem of missing or false alerts is pinned at its origin and generation of right alerts at right time is facilitated. The system of the present disclosure is being used in different engagements across domains to suppress false alerts and capture genuine alerts.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for recommending optimal thresholds for anomaly detection in an information technology (IT) system environment, the method comprising:

receiving, via one or more Input/Output (I/O) interfaces, a plurality of data corresponding to one or more entities in the IT system environment and a plurality of metrics related to the one or more entities, wherein the IT system environment represents represent a setup of a domain agnostic infrastructure of an organization, wherein the one or more entities represent components of the IT system environment, wherein plurality of metrics include a CPU utilization, a memory utilization, a disk utilization, and a process with a start time, an end time and a runtime in a batch system;

detecting, via the one or more hardware processors, a steady state of each of the plurality of metrics with a change-point detection referring to a persistent change in behavior of the plurality of metrics in accordance with internal infrastructural changes, and the change-point detection is performed, prior to analyzing data for recommending the optimal threshold recommendation, to derive recent steady state of the metrics under consideration, and an ensemble of change-point detection algorithms is used to detect changes in a mean, a variation, patterns, and a trend of the metrics;

deriving, via the one or more hardware processors, (i) one or more temporal properties, and (ii) one or more spatio-temporal properties of each of the plurality of metrics in accordance with the detected steady state;

generating, via the one or more hardware processors, (a) a static threshold, (b) a dynamic threshold using temporal analysis, and (c) a composite threshold based on the derived (i) the one or more temporal properties, and (ii) the one or more spatio-temporal properties of each of the plurality of metrics using one or more models, wherein the static threshold is generated based on a mean $\mu(g)$, a standard variation $\sigma(g)$, and an aggressiveness factor $\alpha$ of each of the plurality of metrics related to the one or more entities in the system environment, wherein a value of the aggressiveness factor $\alpha$ is derived based on closeness of data distribution to a normal behavior, wherein when the metric under consideration observes variation, then the static threshold (ST) is defined as:

$$ST(\text{upper}) = \mu(g) + \alpha\sigma(g)$$

$$ST(\text{lower}) = \mu(g) - \alpha\sigma(g),$$

wherein when the static threshold values are derived using behavioral properties of metrics, a plurality of domain constraints including upper limit of thresholds (UL)

and lower limit of thresholds (LL) are factored to recommend an optimal threshold value computed as:

$$ST(\text{upper}) = \max(ST(\text{upper}), LL)$$

$$ST(\text{upper}) = \min(ST(\text{lower}), UL),$$

wherein the dynamic threshold represents temporal threshold recommendation that is generated when a metric of the plurality of metrics under consideration observes significant variations across varied temporal dimensions and is derived and recommended when the metric under consideration observes significant variations across varied temporal dimensions and follows a specific pattern;

detecting, via the one or more hardware processors, one or more anomalies in the received plurality of data when a value of the generated at least one of (a) the static threshold, (b) the dynamic threshold, and (c) the composite threshold is exceeded to a predefined value;

adaptively updating, via the one or more hardware processors, the one or more models to the at least one of (i) the one or more temporal properties, and (ii) the one or more spatio-temporal properties of each of the plurality of metrics related to the one or more entities in the IT system environment based on at least one of (a) a self-learning mechanism, and (b) a self-tuning mechanism, wherein in the self-learning mechanism, one or more parameters associated with the plurality of metrics, including a temporal pattern, a level of aggressiveness, an intra-bucket variation (ITA), an inter-bucket variation (ITR), and a score generated using ITA and ITR, in accordance with one or more inputs obtained as a feedback from one or more users are learnt and replicates the learning on each of the plurality of metrics related to the one or more entities in the IT system environment, wherein in the self-tuning mechanism, group of similar metrics are identified, and corresponding set of representative metrics for a cluster of the set of similar metrics are identified, followed by statistics derived from a previous run of temporal analysis to combine with a statistics of a real time delta data; and applying the adaptively updated models across domains to suppress false alerts and capture true positives.

2. The processor implemented method of claim 1, further comprising:

continuously monitoring, a mismatch between the generated at least one of (a) the static threshold, (b) the dynamic threshold, and (c) the composite threshold with a pre-determined threshold; and recommending, a corrected threshold when a mismatch between the generated at least one of (a) the static threshold, (b) the dynamic threshold, and (c) the composite threshold and the pre-determined threshold is detected.

3. The processor implemented method of claim 1, wherein generating the dynamic threshold comprises:

resampling and categorizing the plurality of data into a plurality of buckets for a plurality of dimensions of the one or more temporal properties of each of the plurality of metrics related to the one or more entities in the system environment;

computing a representative value for each bucket from the plurality of buckets, wherein the representative value is computed based on a mean, and a standard deviation for each bucket from the plurality of buckets for each dimension from the plurality of dimensions;

computing an intra-bucket variation (ITA) for the plurality of data and inter-bucket variation (ITR) for the representative value for each bucket from the plurality of buckets, wherein the intra-bucket variation (ITA) captures average spread of a plurality of data points within each bucket from the plurality of buckets and the inter-bucket variation (ITR) captures variation of the plurality of data points across the plurality of dimensions;

generating a score for the one or more temporal properties of each of the plurality of metrics related to the one or more entities in the system environment based on the ITR and ITA;

identifying an optimal temporal property from the one or more temporal properties of each of the plurality of metrics related to the one or more entities in the system environment based on the generated score; and generating the dynamic threshold based on the mean, the standard variation and an aggressiveness factor of each of the plurality of metrics related to the one or more entities in the system environment in accordance with the identified temporal property from the one or more temporal properties as $$DT_i(\text{upper}) = \mu(b)_i + \alpha_\sigma(b)_i \forall \, i \in 1, 2, \ldots N(b)$$

$$DT_i(\text{lower}) = \mu(b)_i - \alpha_\sigma(b)_i \forall \, i \in 1, 2, \ldots N(b),$$

wherein when the dynamic threshold values are derived using behavioral properties of metrics, a plurality of domain constraints including an upper limit UL and a lower limit LL are factored to recommend an optimal threshold value for each dimension value computed as:

$$DT_i = \max(DT_i, LL) \forall \, i \in 1, 2, \ldots N(b)$$

$$DT_i = \min(DT_i, UL) \forall \, i \in 1, 2, \ldots N(b).$$

4. The processor implemented method of claim 1, wherein generating the composite threshold comprises:

receiving, a first set of events corresponding to an entity identified from the one or more entities in the system environment with no metric;

mining, using one or more data sources, an influencing relationship between a node of the identified entity and a plurality of influencing metrics corresponding to the node of the identified entity to define a set of spatial dependencies;

applying a temporal threshold analysis to each influencing metric from the plurality of influencing metrics to generate at least one of a (i) a respective static threshold, (ii) a respective dynamic threshold, and (iii) a second set of events;

correlating the second set of events with the first set of events occurring in the node of the identified entity to access a plurality of temporal correlations; and generating the composite threshold based on the plurality of temporal correlations, wherein the plurality of temporal correlations are indicative of behavior of the plurality of influencing metrics.

5. The processor implemented method of claim 1, wherein the self-learning mechanism comprises:

generating, a plurality of clusters of the plurality of metrics related to the one or more entities based on a plurality of metric properties;

identifying a set of representative metrics for each cluster from the plurality of clusters of the plurality of metrics based on a similarity in the plurality of metric properties;

generating, at least one of (i) a plurality of optimal static thresholds, (ii) a plurality of optimal dynamic thresholds, and (iii) a plurality of optimal composite thresholds across varying degree of aggressiveness for each representative metric from the set of representative metrics for each cluster from the plurality of clusters of the plurality of metrics;

selecting, an optimal threshold from the at least one of (i) the plurality of optimal static thresholds, (ii) the plurality of optimal dynamic thresholds, and (iii) the plurality of optimal composite thresholds by applying one or more inputs obtained as feedback from one or more users includes user's preferred dimensions, user-defined threshold, and user's preferred aggressiveness factor, on each of the set of representative metrics for each cluster from the plurality of clusters of the plurality of metrics and replicate learning on each of the plurality of metrics related to the one or more entities in the system environment;

determining, a change in one or more parameters associated with the plurality of metrics related to the one or more entities in the system environment based on the one or more inputs obtained as the feedback from the one or more users on each cluster from the plurality of clusters of the plurality of metrics; and self-learning, the one or more parameters associated with the plurality of metrics in accordance with the one or more inputs obtained as the feedback from the one or more users.

6. The processor implemented method of claim 1, wherein the self-tuning mechanism comprises:

obtaining, a plurality of real time delta data corresponding to the one or more entities and a set of metrics related to the one or more entities in the system environment for the plurality of real time delta data;

performing temporal analysis on the set of metrics related to the one or more entities in the system environment for the plurality of real-time delta data, wherein the temporal analysis comprising:

(a) generating, a plurality of clusters of the set of metrics related to the one or more entities in IT system environment for the plurality of real time delta data based on the plurality of metric properties;

(b) identifying a representative metric for each cluster from the plurality of clusters of the set of metrics based on a similarity in the plurality of metric properties; and (c) generating, at least one of (i) a plurality of optimal static thresholds, (ii) a plurality of optimal dynamic thresholds, and (iii) a plurality of optimal composite thresholds across varying degree of aggressiveness for the representative metric for each cluster from the plurality of clusters of the set of metrics;

determining, a change in the one or more parameters associated with the set of metrics related to the one or more entities in the system environment for the plurality of real time delta data; and self-tuning, by auto-optimizing the one or more parameters associated with the set of metrics based on (a) the self-learning of the one or more parameters associated with the plurality of metrics and (b) the temporal analysis performed on the set of metrics related to the one or more entities in the system environment for the plurality of real-time delta data.

7. A system for recommending optimal thresholds for anomaly detection in an information technology (IT) system environment comprising:

a memory storing instructions;

one or more Input/Output (I/O) interfaces; and one or more hardware processors coupled to the memory via the one or more I/O interfaces, wherein the one or more hardware processors are configured by the instructions to:

receive a plurality of data corresponding to one or more entities in the IT system environment and a plurality of metrics related to the one or more entities, wherein the IT system environment represents represent a setup of a domain agnostic infrastructure of an organization, wherein the one or more entities represent components of the IT system environment, wherein plurality of metrics includes a CPU utilization, a memory utilization, a disk utilization, and a process with a start time, an end time and a runtime in a batch system;

detect a steady state of each of the plurality of metrics with a change-point detection referring to a persistent change in behavior of the plurality of metrics in accordance with internal infrastructural changes, and the change-point detection is performed, prior to analyzing data for recommending the optimal threshold recommendation, to derive recent steady state of the metrics under consideration, and an ensemble of change-point detection algorithms is used to detect changes in a mean, a variation, patterns, and a trend of the metrics;

derive (i) one or more temporal properties, and (ii) one or more spatio-temporal properties of each of the plurality of metrics in accordance with the detected steady state;

generate (a) a static threshold, (b) a dynamic threshold using temporal analysis, and (c) a composite threshold based on the derived (i) the one or more temporal properties, and (ii) the one or more spatio-temporal properties of each of the plurality of metrics using one or more models, wherein the static threshold is generated based on a mean $\mu(g)$, a standard variation $\sigma(g)$, and an aggressiveness factor $\alpha$ of each of the plurality of metrics related to the one or more entities in the system environment, wherein a value of the aggressiveness factor $\alpha$ is derived based on closeness of data distribution to a normal behavior, wherein when the metric under consideration observes variation, then the static threshold (ST) is defined as:

$$ST(\text{upper}) = \mu(g) + \alpha\sigma(g)$$

$$ST(\text{lower}) = \mu(g) - \alpha\sigma(g),$$

wherein when the static threshold values are derived using behavioral properties of metrics, a plurality of domain constraints including upper limit of thresholds (UL) and lower limit of thresholds (LL) are factored to recommend an optimal threshold value computed as:

$$ST(\text{upper}) = \max(ST(\text{upper}), LL)$$

$$ST(\text{upper}) = \min(ST(\text{lower}), UL),$$

wherein the dynamic threshold represents temporal threshold recommendation that is generated when a metric of the plurality of metrics under consideration observes significant variations across varied temporal dimensions and is derived and recommended when the metric under consideration observes significant variations across varied temporal dimensions and follows a specific pattern;

detect one or more anomalies in the received plurality of data when a value of the generated at least one of (a) the static threshold, (b) the dynamic threshold, and (c) the composite threshold is exceeded to a predefined value;

adaptively update the one or more models to the at least one of (i) the one or more temporal properties, and (ii) the one or more spatio-temporal properties of each of the plurality of metrics related to the one or more entities in the IT system environment based on at least one of (a) a self-learning mechanism, and (b) a self-tuning mechanism, wherein in the self-learning mechanism, one or more parameters associated with the plurality of metrics, including a temporal pattern, a level of aggressiveness, an intra-bucket variation (ITA), an inter-bucket variation (ITR), and a score generated using ITA and ITR, in accordance with one or more inputs obtained as a feedback from one or more users are learnt and replicates the learning on each of the plurality of metrics related to the one or more entities in the IT system environment, wherein in the self-tuning mechanism, group of similar metrics are identified, and corresponding set of representative metrics for a cluster of the set of similar metrics are identified, followed by statistics derived from a previous run of temporal analysis to combine with a statistics of a real time delta data; and applying the adaptively updated models across domains to suppress false alerts and capture true positives.

8. The system of claim 7, further comprising:

continuously monitoring, a mismatch between the generated at least one of (a) the static threshold, (b) the dynamic threshold, and (c) the composite threshold with a pre-determined threshold; and recommending, a corrected threshold when a mismatch between the generated at least one of (a) the static threshold, (b) the dynamic threshold, and (c) the composite threshold and the pre-determined threshold is detected.

9. The system of claim 7, wherein generating the dynamic threshold comprises:

resampling and categorizing the plurality of data into a plurality of buckets for a plurality of dimensions of the one or more temporal properties of each of the plurality of metrics related to the one or more entities in the system environment;

computing a representative value for each bucket from the plurality of buckets, wherein the representative value is computed based on a mean, and a standard deviation for each bucket from the plurality of buckets for each dimension from the plurality of dimensions;

computing an intra-bucket variation (ITA) for the plurality of data and inter-bucket variation (ITR) for the representative value for each bucket from the plurality of buckets, wherein the intra-bucket variation (ITA) captures average spread of a plurality of data points within each bucket from the plurality of buckets and the inter-bucket variation (ITR) captures variation of the plurality of data points across the plurality of dimensions;

generating a score for the one or more temporal properties of each of the plurality of metrics related to the one or more entities in the system environment based on the ITR and ITA;

identifying an optimal temporal property from the one or more temporal properties of each of the plurality of metrics related to the one or more entities in the system environment based on the generated score; and generating the dynamic threshold based on the mean, the standard variation and an aggressiveness factor of each of the plurality of metrics related to the one or more entities in the system environment in accordance with the identified temporal property from the one or more temporal properties as $$DT_i(\text{upper}) = \mu(b)_i + \alpha_\sigma(b)_i \forall\, i \in 1, 2, \ldots N(b)$$

$$DT_i(\text{lower}) = \mu(b)_i - \alpha_\sigma(b)_i \forall\, i \in 1, 2, \ldots N(b),$$

wherein when the dynamic threshold values are derived using behavioral properties of metrics, a plurality of domain constraints including an upper limit UL and a lower limit LL are factored to recommend an optimal threshold value for each dimension value computed as:

$$DT_i = \max(DT_i, LL) \forall\, i \in 1, 2, \ldots N(b)$$

$$DT_i = \min(DT_i, UL) \forall\, i \in 1, 2, \ldots N(b).$$

10. The system of claim 7, wherein generating the composite threshold comprises:

receiving, a first set of events corresponding to an entity identified from the one or more entities in the system environment with no metric;

mining, using one or more data sources, an influencing relationship between a node of the identified entity and a plurality of influencing metrics corresponding to the node of the identified entity to define a set of spatial dependencies;

applying a temporal threshold analysis to each influencing metric from the plurality of influencing metrics to generate at least one of a (i) a respective static threshold, (ii) a respective dynamic threshold, and (iii) a second set of events;

correlating the second set of events with the first set of events occurring in the node of the identified entity to access a plurality of temporal correlations; and generating the composite threshold based on the plurality of temporal correlations, wherein the plurality of temporal correlations are indicative of behavior of the plurality of influencing metrics.

11. The system of claim 7, wherein the self-learning mechanism comprises:

generating, a plurality of clusters of the plurality of metrics related to the one or more entities based on a plurality of metric properties;

identifying a set of representative metrics for each cluster from the plurality of clusters of the plurality of metrics based on a similarity in the plurality of metric properties;

generating, at least one of (i) a plurality of optimal static thresholds, (ii) a plurality of optimal dynamic thresholds, and (iii) a plurality of optimal composite thresholds across varying degree of aggressiveness for each representative metric from the set of representative metrics for each cluster from the plurality of clusters of the plurality of metrics;

selecting, an optimal threshold from the at least one of (i) the plurality of optimal static thresholds, (ii) the plurality of optimal dynamic thresholds, and (iii) the plurality of optimal composite thresholds by applying one or more inputs obtained as feedback from one or more users includes user's preferred dimensions, user-defined threshold, and user's preferred aggressiveness factor, on each of the set of representative metrics for each cluster from the plurality of clusters of the plurality of metrics and replicate learning on each of the plurality of metrics related to the one or more entities in the system environment;

determining, a change in one or more parameters associated with the plurality of metrics related to the one or more entities in the IT system environment based on the one or more inputs obtained as the feedback from the one or more users on each cluster from the plurality of clusters of the plurality of metrics; and self-learning, the one or more parameters associated with the plurality of metrics in accordance with the one or more inputs obtained as the feedback from the one or more users.

12. The system of claim 7, wherein the self-tuning mechanism comprises:

obtaining, a plurality of real time delta data corresponding to the one or more entities and a set of metrics related to the one or more entities in the system environment for the plurality of real time delta data;

performing temporal analysis on the set of metrics related to the one or more entities in the system environment for the plurality of real-time delta data, wherein the temporal analysis comprising:

(a) generating, a plurality of clusters of the set of metrics related to the one or more entities in a system environment for the plurality of real time delta data based on the plurality of metric properties;

(b) identifying a representative metric for each cluster from the plurality of clusters of the set of metrics based on a similarity in the plurality of metric properties; and (c) generating, at least one of (i) a plurality of optimal static thresholds, (ii) a plurality of optimal dynamic thresholds, and (iii) a plurality of optimal composite thresholds across varying degree of aggressiveness for the representative metric for each cluster from the plurality of clusters of the set of metrics;

determining, a change in the one or more parameters associated with the set of metrics related to the one or more entities in the IT system environment for the plurality of real time delta data; and self-tuning, by auto-optimizing the one or more parameters associated with the set of metrics based on (a) the self-learning of the one or more parameters associated with the plurality of metrics and (b) the temporal analysis performed on the set of metrics related to the one or more entities in the system environment for the plurality of real-time delta data.

13. One or more non-transitory computer readable mediums comprising one or more instructions which when executed by one or more hardware processors cause:

receiving, a plurality of data corresponding to one or more entities in a IT system environment and a plurality of metrics related to the one or more entities, wherein the IT system environment represents represent a setup of a domain agnostic infrastructure of an organization, wherein the one or more entities represent components of the IT system environment, wherein plurality of metrics include a CPU utilization, a memory utilization, a disk utilization, and a process with a start time, an end time and a runtime in a batch system;

detecting a steady state of each of the plurality of metrics with a change-point detection referring to a persistent change in behavior of the plurality of metrics in accordance with internal infrastructural changes, and the change-point detection is performed, prior to analyzing data for recommending the optimal threshold recommendation, to derive recent steady state of the metrics under consideration, and an ensemble of change-point detection algorithms is used to detect changes in a mean, a variation, patterns, and a trend of the metrics;

deriving, (i) one or more temporal properties, and (ii) one or more spatio-temporal properties of each of the plurality of metrics in accordance with the detected steady state;

generating, (a) a static threshold, (b) a dynamic threshold using temporal analysis, and (c) a composite threshold based on the derived (i) the one or more temporal properties, and (ii) the one or more spatio-temporal properties of each of the plurality of metrics using one or more models, wherein the static threshold is generated based on a mean $\mu(g)$, a standard variation $\sigma(g)$, and an aggressiveness factor $\alpha$ of each of the plurality of metrics related to the one or more entities in the system environment, wherein a value of the aggressiveness factor $\alpha$ is derived based on closeness of data distribution to a normal behavior, wherein when the metric under consideration observes variation, then the static threshold (ST) is defined as:

$$ST(\text{upper}) = \mu(g) + \alpha\sigma(g)$$

$$ST(\text{lower}) = \mu(g) - \alpha\sigma(g),$$

wherein when the static threshold values are derived using behavioral properties of metrics, a plurality of domain constraints including upper limit of thresholds (UL) and lower limit of thresholds (LL) are factored to recommend an optimal threshold value computed as:

$$ST(\text{upper}) = \max(ST(\text{upper}), LL)$$

$$ST(\text{upper}) = \min(ST(\text{lower}), UL),$$

wherein the dynamic threshold represents temporal threshold recommendation that is generated when a metric of the plurality of metrics under consideration observes significant variations across varied temporal dimensions and is derived and recommended when the metric under consideration observes significant variations across varied temporal dimensions and follows a specific pattern;

detecting, one or more anomalies in the received plurality of data when a value of the generated at least one of (a) the static threshold, (b) the dynamic threshold, and (c) the composite threshold is exceeded to a predefined value;

adaptively updating, the one or more models to the at least one of (i) the one or more temporal properties, and (ii) the one or more spatio-temporal properties of each of the plurality of metrics related to the one or more entities in the IT system environment based on at least one of (a) a self-learning mechanism, and (b) a self-tuning mechanism, wherein in the self-learning mechanism, one or more parameters associated with the plurality of metrics, including a temporal pattern, a level of aggressiveness, an intra-bucket variation (ITA), an inter-bucket variation (ITR), and a score generated using ITA and ITR, in accordance with one or more inputs obtained as a feedback from one or more users are learnt and replicates the learning on each of the plurality of metrics related to the one or more entities in the IT system environment, wherein in the self-tuning mechanism, group of similar metrics are identified, and corresponding set of representative metrics for a cluster of the set of similar metrics are identified, followed by statistics derived from a previous run of temporal analysis to combine with a statistics of a real time delta data; and applying the adaptively updated models across domains to suppress false alerts and capture true positives.

\* \* \* \* \*